US007170623B2

(12) United States Patent
Matoba et al.

(10) Patent No.: US 7,170,623 B2
(45) Date of Patent: Jan. 30, 2007

(54) TRANSFERRING PRINT DATA BETWEEN PRINT MANAGEMENT APPARATUSES

(75) Inventors: Tatsuo Matoba, Kanagawa (JP); Toru Kimura, Kanagawa (JP); Tamaki Kamata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 753 days.

(21) Appl. No.: 10/113,679

(22) Filed: Apr. 2, 2002

(65) Prior Publication Data
US 2002/0154335 A1  Oct. 24, 2002

(30) Foreign Application Priority Data
Apr. 6, 2001  (JP)  ............... 2001-108767

(51) Int. Cl.
*G06K 15/00* (2006.01)
(52) U.S. Cl. ................. 358/1.15; 358/1.16
(58) Field of Classification Search .......... 358/1.15, 358/1.18, 1.16, 400, 468, 471, 1.6, 1.13; 705/30; 302/162
See application file for complete search history.

(56) References Cited

U.S. PATENT DOCUMENTS 5,859,956 A * 1/1999 Sugiyama et al. ......... 358/1.13
6,563,944 B1 * 5/2003 Kumada .................... 382/162
6,687,018 B1 * 2/2004 Leong et al. .............. 358/1.15
6,775,023 B1 * 8/2004 Fukunaga et al. ......... 358/1.15
6,804,022 B2 * 10/2004 Fujiwara et al. .......... 358/1.15
2002/0184120 A1 * 12/2002 Suzuki et al. ................ 705/30
2003/0011805 A1 * 1/2003 Yacoub .................... 358/1.15

* cited by examiner

*Primary Examiner*—Jerome Grant, II
(74) *Attorney, Agent, or Firm*—Fitzpatrick, Cella, Harper & Scinto

(57) ABSTRACT

In a condition that a printing device cannot be used, print can be requested to other print managing device. A center server 102 includes a print server information storage device 210 for registering vacant status of printing devices managed by a plurality of print servers 103, and each print server 103 includes external print request means 207 for requesting print of print order data to other print server 103, status registration means 205 for registering vacant status information of the printing device managed by the server itself in the print server information storage device 210, and external print request candidate reference means 206 for automatically selecting other print server 103 to which the print of the print order data is requested on the basis of the vacant status information of the printing devices managed by other print servers 103 registered in the print server information storage device 210.

11 Claims, 25 Drawing Sheets

FIG. 7

| ORDER NUMBER | CLIENT PRINT MANAGING DEVICE NUMBER | REQUEST DATE | COMMENT |
|---|---|---|---|
| 701 | 702 | 703 | 704 |

```
#ORDER   CLIENT PRINT MANAGING   REQUEST        COMMENT
NUMBER,  DEVICE NUMBER,          DATE,
110201135900000011,  1102,  20001221151530,
110204135200000021,  1102,  20001224123548,  UNDER PIXEL ADJUSTMENT
110208136400000001,  1102,  20001229110024,
```

| ORDER NUMBER | PRINT MANAGING DEVICE NUMBER | ORDERER NUMBER | ORDER DATE | PRINT STATUS | PRINT CHARGE | RECEIVING METHOD | DESTINATION NAME | DESTINATION ADDRESS | DESTINATION TEL NUMBER | DELIVERY CHARGE |
|---|---|---|---|---|---|---|---|---|---|---|
| 901 | 902 | 903 | 904 | 905 | 906 | 907 | 908 | 909 | 910 | 911 |

| ORDER NUMBER | PRINT DATA NUMBER | PRINT SERVICE TYPE | PRINT PART NUMBER | ORDER PART NUMBER | PAGE NUMBER | PRINTER NUMBER | PRINT PARAMETER |
|---|---|---|---|---|---|---|---|
| 1001 | 1002 | 1003 | 1004 | 1005 | 1006 | 1007 | 1008 |

| PRINT MANAGING DEVICE NUMBER | PRINTER CODE | PRINTER STATUS | e-mail ADDRESS |
|---|---|---|---|
| 1101 | 1102 | 1103 | 1104 |

1100

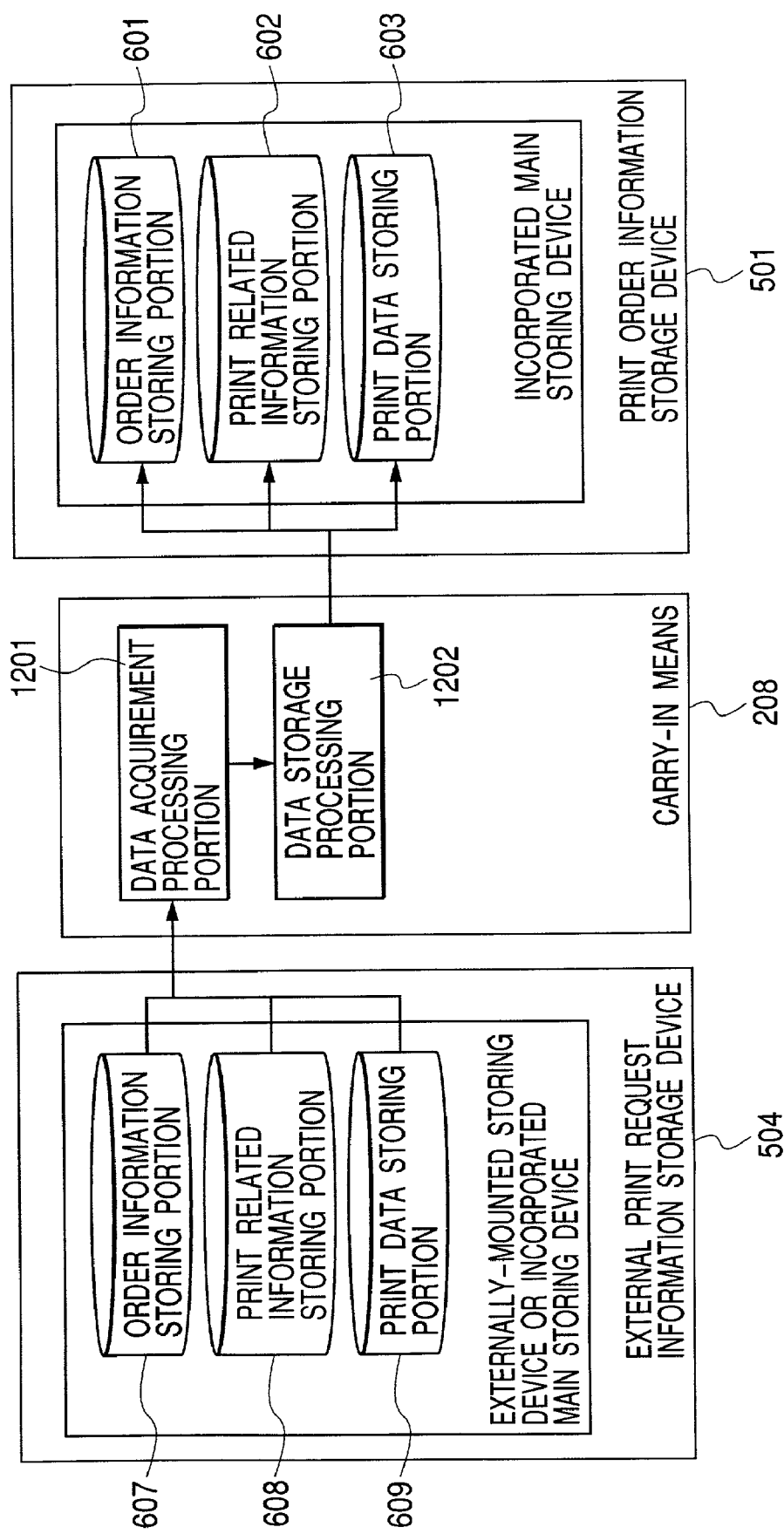

FIG. 13

ORDER EXTERNAL PRINT REQUEST

| STATUS | ORDER ID | CLIENT NAME | RECEIVING DATE | ShopID |
|---|---|---|---|---|
| PRINT WAITING | 0001231399000543 | TOM | 2000/07/18 | 1102 <OWN SHOP> |

ORDER TYPE: Print Shop ORDER

RESERVATION FOLDER: A¥ [REFERENCE(R)]

REQUEST ShopID(S): 0012 [REFER SERVER INFORMATION] [INFORM TO CLIENT]

Shop NAME: IMAGE LAND AKASAKA SHOP

MAIL ADDRESS: akasaka@mail.com

TEL NUMBER: 03-3333-3333

ADDRESS: 1-1-1, AKASAKA, MINATO-KU, TOKYO

REPRESENTATIVE NAME: ICHIRO SUZUKI

[OK] [CANCEL]

FIG. 14

| ORDER CARRY-IN | ? ☒ |

DESIGNATE PARENT FOLDER OF CARRY-IN ORDER

A¥                                    REFERENCE(R)

| STATUS | ORDER ID | CLIENT NAME | RECEIVING DATA | Shop... | ORDER |
|---|---|---|---|---|---|
| PRINT WAITING | EOMB011296000 | MATOBA Tat... | 2000/04/06... | 33001 | SHOP |

OK    CANCEL

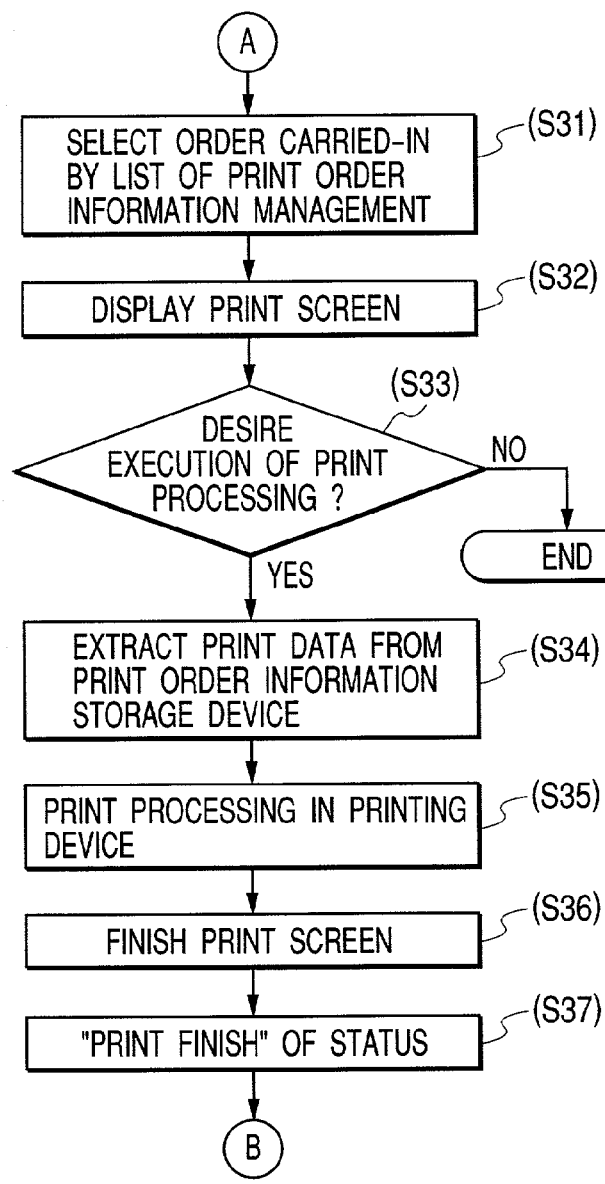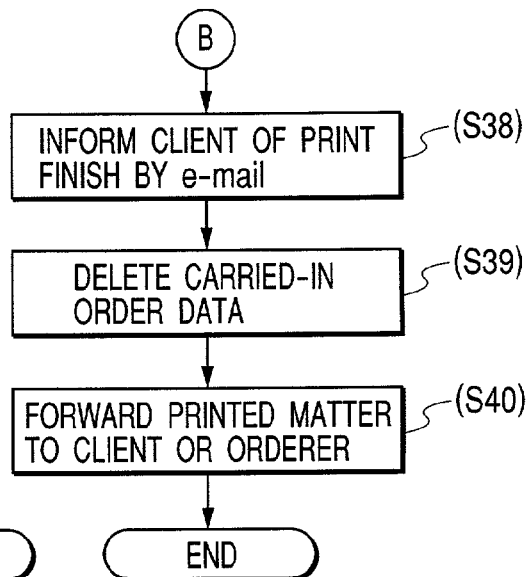
FIG. 16B
FIG. 16C

| PRINT MANAGING DEVICE NUMBER | PRINT MANAGING DEVICE STATUS | e-mail ADDRESS | ADDRESS | TEL NUMBER | NAME | REPRESENTATIVE NAME | DELIVERY POSSIBLE FLAG | PROVIDED SERVICE TYPE |
|---|---|---|---|---|---|---|---|---|
| 10201 | 10202 | 10203 | 10204 | 10205 | 10206 | 10207 | 10208 | 10209 |

| PRINT MANAGING DEVICE NUMBER | PRINTING DEVICE NUMBER | PRINTER STATUS | PRINT POSSIBLE SERVICE TYPE |
|---|---|---|---|
| 10301 | 10302 | 10303 | 10304 |

| ORDERER NUMBER | ORDERER NAME | e-mail ADDRESS | TEL NUMBER | EFFECTIVE TERM |
|---|---|---|---|---|
| 10401 | 10402 | 10403 | 10404 | 10405 |

| PRINT MANAGING DEVICE NUMBER | PRINT SERVICE NUMBER | SERVICE NAME | TIME LIMIT | PRINT PARAMETER | PRINT UNIT COST | BASIC DELIVERY CHARGE |
|---|---|---|---|---|---|---|
| 10501 | 10502 | 10503 | 10504 | 10505 | 10506 | 10507 |

| PRINT MANAGING DEVICE NUMBER | DELIVERY CHARGE CHANGING FACTOR | CHANGED VALUE | CHANGED CHARGE |
|---|---|---|---|
| 10601 | 10602 | 10603 | 10604 |

| PRINT SERVICE NUMBER | SERVICE NAME | BASIC PRINT PARAMETER | PRINT POSSIBLE PRINTING DEVICE NUMBER |
|---|---|---|---|
| 10701 | 10702 | 10703 | 10704 |

| PRINT SERVER GROUP NUMBER | GROUP NAME | COMPANY | SUBSTITUTION PRINT COST DISUSE FLAG |
|---|---|---|---|
| 10801 | 10802 | 10803 | 10804 |

| PRINT MANAGING DEVICE NUMBER | PRINT SERVER GROUP NUMBER | SUBSTITUTION PRINT CONDITION PRIORITY ORDER ||||
|---|---|---|---|---|---|
| | | SAME GROUP | TIME LIMIT | COST | AREA |
| 10901 | 10902 | 10903 | 10904 | 10905 | 10906 |

~10900

TRANSFERRING PRINT DATA BETWEEN PRINT MANAGEMENT APPARATUSES

BACKGROUND OF THE INVENTION

1. Field of the Invention

The present invention relates to a printing system, device and method for managing print management, a computer program and a computer-readable storing medium.

2. Related Background Art

In the past, as information techniques have been progressed, print service via a network has been popularized. On the basis of such print service, the user can obtain various printed matters such as photographic prints, T-shirt prints and the like by ordering the print from his personal computer (PC) via an internet. In recent specification of print service, print order produced by client as the user is transmitted to a center server as a print service managing server through the internet. In the center server, the print order received from the client is analyzed and the server instructs the print order to a print shop designated by the print order. In the print shop to which the print order is instructed, print processing is effected by using either of printing devices in the print shop, thereby producing the printed matter.

However, for the reason that the printing devices in the print shop to which the print order is instructed cannot be utilized, if print request is effected by changing the accepted print order data to another shop managing other available printing devices, the operator in the center server must manually duplicate the print order for the substituted print shop, and, double-print must be prevented by canceling the print order of the original print shop by recognizing the fact that the print is being requested to the substituted print shop.

Further, in such conventional print service effected via the internet, since a substitution processing method is not particularly taken into account, also at the substituted print shop to which the print is requested, there is no means for discriminating whether print-requested print order data is requested by which client or by the original print shop, and, thus, correct orderer may not be specified.

In the above-mentioned conventional system, in order to recognize the fact that the print is being requested to the other print shop and to discriminate the substituted print order data from the print order data of the original client at the other print shop side, the manager must have recognition by using any other means, and manual management must be effected, thereby making the managing method complicated. Thus, it is not desirable in consideration of print ensuring.

Further, when the print order data is carried-in to request the print to the substituted print shop from the original print shop and when the requested print order data is carried-in to the substituted print shop, expert knowledge is required.

Further, although it is considered that the client user wishes that the print is performed in the print shop in which the print should firstly be effected, in such a case, it is not desirable to effect substitution processing. Thus, although it is considered that the user is inquired whether the substitution processing can be effected or not, in order to recognize such inquiry by the user via a mail or the like, there arises time lag. This is not desirable when the user hastens the print.

SUMMARY OF THE INVENTION

The present invention is made to eliminate such conventional problems, and an object of the present invention is to provide an arrangement in which, if print order issued via an internet cannot be print-outputted at a print shop as an original output destination, substitution processing of print shop can easily be performed without operator's complicated manipulation.

Further, a second object of the present invention is to provide an arrangement in which it is automatically judged whether substitution processing of print shop is performed or not in accordance with set contents of print order.

Further, a third object of the present invention is to permit automatic selection of the fact that it is optimum which print managing device as a print shop should be selected for print request if a print shop to which print order is outputted cannot perform print output for any reason(s), on the basis of print attribution, particularly a receiving condition.

To achieve the above objects, a printing system according to the present invention wherein a central managing device as a center server for receiving print order data from a client computer is connected to print managing devices as plural print shops for managing printing devices for effecting print output of the print order data comprises print order managing means for managing the print order data, and substitution request means for requesting print processing of the print order data to other print managing device if print output processing cannot be carried out by the printing devices of the print managing devices.

Further, the central managing device may comprise printing device vacant status information storing means for registering a vacant status of the printing devices managed by the plural print managing devices, and the print managing device may comprise registration means for registering the vacant status information of the printing device by the print managing device itself to the printing device vacant status information storing means.

Further, the print managing device may further comprise reference means for referring the vacant status information of the printing device managed by other print managing device registered in the printing device vacant status information storing means.

Further, the print managing device may include the substitution request means, and the print managing device may issue the print order data to the central managing device via the internet in order to cause other print managing device to carry out substitution print.

Further, the print managing device may comprise print order information storage means for storing the print order data to be printed by the printing device managed by the print managing device itself, and substitution request information storage means for storing the print order data print-requested to other print managing device and the print order data print-requested from other print managing device.

Further, the print managing device may comprise informing means for informing of print finish to the client print managing device when the print of the substituted print order data is finished.

Further, the substitution request means may comprise retrieval processing means for retrieving other candidate print managing devices capable of being requested and for automatically selecting the optimal print managing device when the print managing device requests the substitution print of the print order data to other print managing devices, substitution information proposal means for displaying a list of the retrieved other print managing devices in a recommendation order, and substitution request information informing means for informing an orderer of the fact that the print is requested to other print managing device.

Further, the central managing device may further comprise shop group managing means for managing grouped plural print managing devices, and therein the substitution requesting means may determine the print managing device to be substituted among from the print managing devices managed by the shop group managing means.

Further, the substitution requesting means may judge whether the substitution request processing of the print order data is executed on the basis of a receiving condition of the print order data.

Further, the substitution requesting means may determine non-execution of the substitution request processing when the receiving condition of the print order data is transferring at the shop and execution of the substitution request processing when the receiving condition of the print order data is delivery.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a view showing format of an external print request information storing portion 610;

FIG. 8 is a view showing database image of the external print request information storing portion 610;

FIG. 9 is a view showing format of order information storing portions 601 and 607;

FIG. 10 is a view showing format of print related information storing portions 602 and 608;

FIG. 11 is a view showing format of a printing device vacant status information storing portion 210;

FIG. 12 is a conceptional view for explaining carry-in processing and for fully explaining an external print request information storage device 504, carry-in means 208 and a print order information storage device 501;

FIG. 13 is a view showing an example of a screen image manipulated when external print request processing is executed;

FIG. 14 is a view showing an example of a screen image manipulated when carry-in processing is executed;

FIGS. 16A, 16B and 16C are a flow chart showing a carry-in processing operation of print data requested from other print managing device;

FIG. 19 is a view showing format of a print managing device information storing portion 10117;

FIG. 20 is a view showing format of a printing device information storing portion 10118;

FIG. 21 is a view showing format of an orderer information storing portion 10121;

FIG. 22 is a view showing format of an individual print service information storing portion 10119;

FIG. 23 is a view showing a construction image of a delivery information storing portion 10120;

FIG. 24 is a view showing format of a print service information storing portion 10122;

FIG. 25 is a view showing format of a substitution print group information storing portion 10123;

FIG. 26 is a view showing a construction image of a substitution print priority frequency information storing portion 10204;

DETAILED DESCRIPTION OF THE PREFERRED EMBODIMENTS

Now, an embodiment of a printing system, device and method for managing print management, a computer program and a computer-readable storing medium according to the present invention will be explained with reference to the accompanying drawings.

Figure 1:
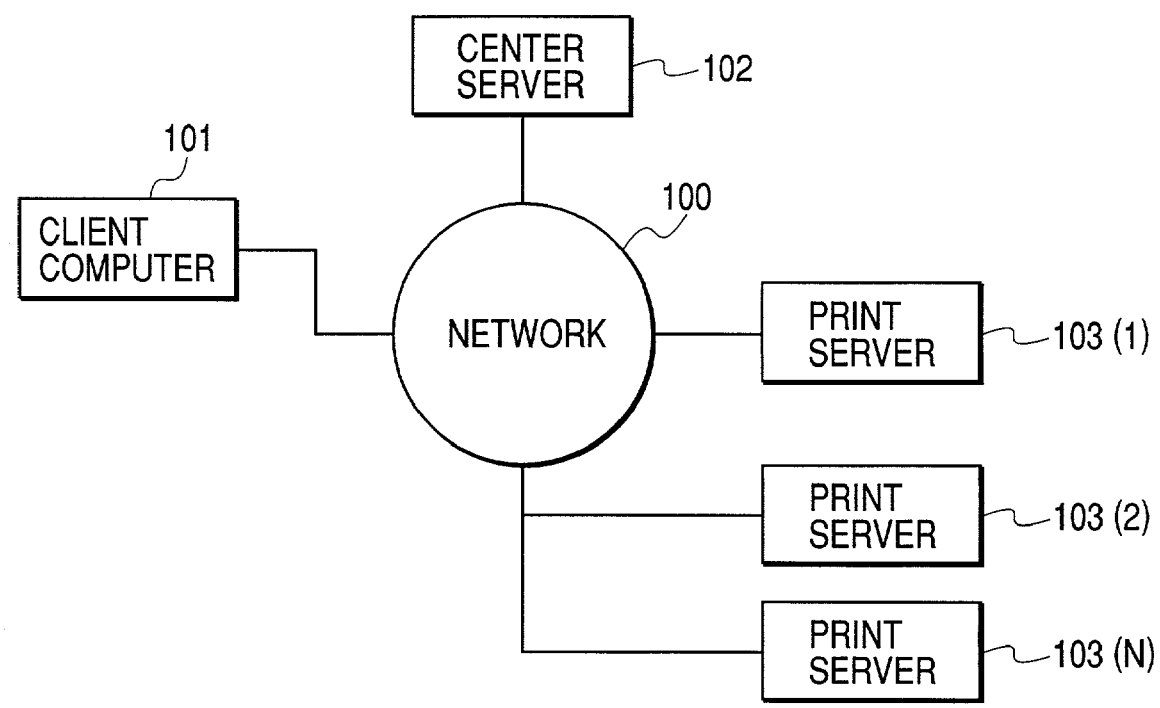
FIG. 1 is a system constructural view for explaining a printing system.

FIG. 1 is a system constructural view for explaining an embodiment of a printing system. As shown in FIG. 1, a client computer 101, a center server 102 and print servers 103(1), 103(2), . . . , 103(N) are connected via an internet 100. In the illustrated embodiment, the print servers correspond to print shops.

Since the print servers 103(1), 103(2), . . . , 103(N) have the same construction, the print server specified among from the plural print servers 103(1), 103(2), . . . , 103(N) is indicated as "print server 103(X)". When all of the print servers 103(1), 103(2), . . . , 103(N) are indicated, they are referred to merely as "print servers 103".

The center server 102 and the print servers 103 are each constituted by a CPU, ROM, RAM, HDD and the like which will be described later, respectively, and are each constituted by an information processing device (computer) which is manipulated by an exclusive operator. The client computer 101 is constituted by a general information processing device (computer) having network browser means. Although the network 100 utilize the internet in the illustrated embodiment, other network system such as LAN (local area network) may be used.

Figure 2:
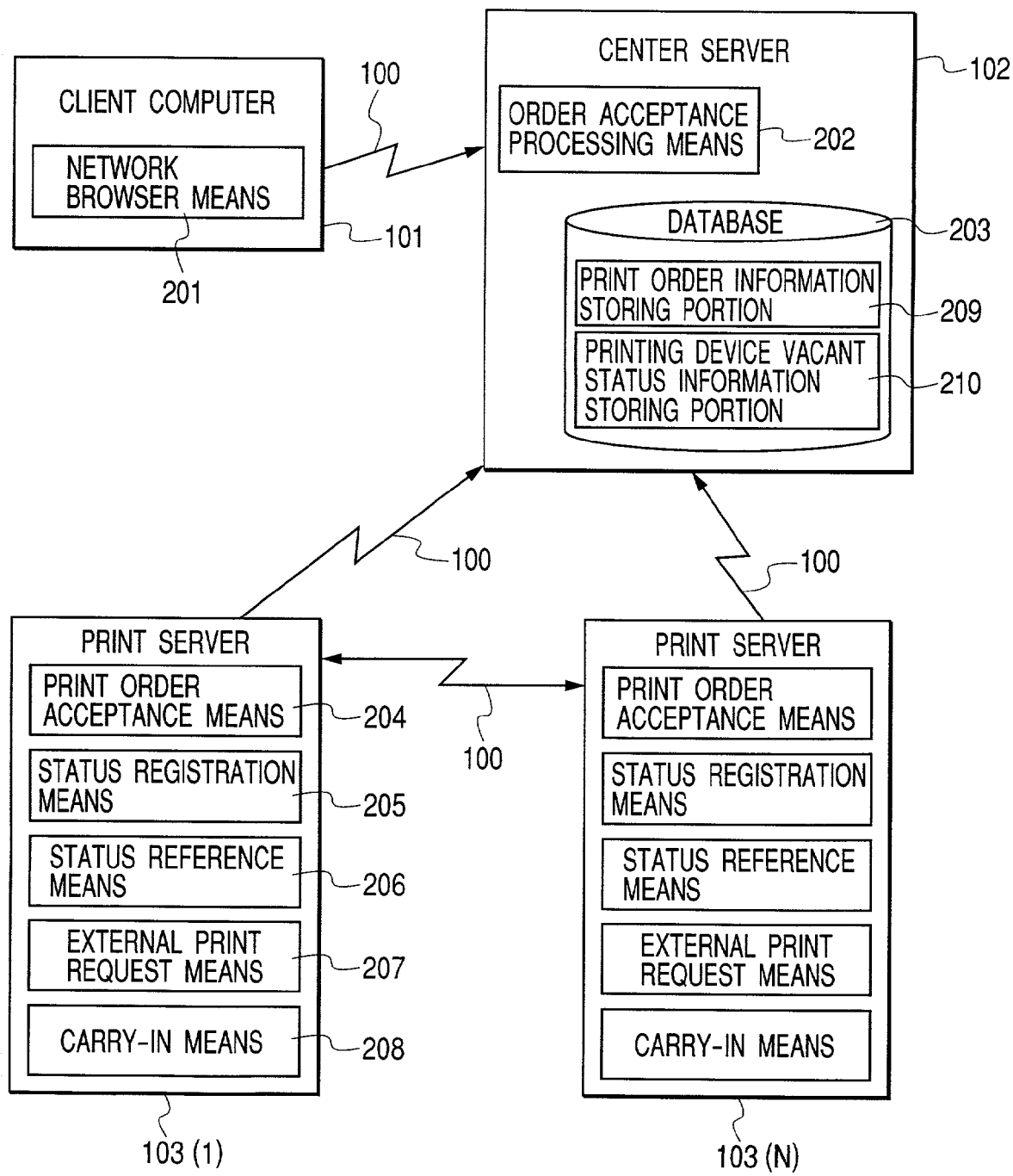
FIG. 2 is a constructural view for explaining summary of a flow of control and information in the printing system.

FIG. 2 is a constructural view for explaining summary of control and flow of information in the printing system. An orderer who produces print order data by using the client computer 101 transmits the print order data to the center server 102 by using network browser means 201 which permits internet browser. Further, by connecting to the center server 102 by using the network browser means 201, a print processing condition of the ordered print order data can be inquired.

Order acceptance processing means 202 of the center server 102 receives the print order data from the client computer 101 and stores it in a print order information storing portion 209 in the database 203.

Print order acceptance means 204 of the print server 103(1) extracts and acquires the target print order data from the print order information storing portion 209 in the database 203 of the center server 102.

Status registration means 205 registers print processing status in a printing device vacant status information storing means 210 in the database 203 of the center server 102 so that the orderer can browse the print processing status and registers a printing device vacant status so that such a status can be browsed by the print server 103(X).

Status retrieval (reference) means 206 retrieves the printing device vacant status of other print server 103(X) from a printing device vacant status information storing portion 210 in the database 203 of the center server 102.

External print request means 207 requests print substitution of the print order data to the print server 103(X) via the network 100 on the basis of the vacant status obtained from center server 102 by the status retrieval means 206.

In contrast, when the print substitution is requested from the print server 103(X) to the print server 103(1), the target print order data is taken by using carry-in means 208.

Figure 3:
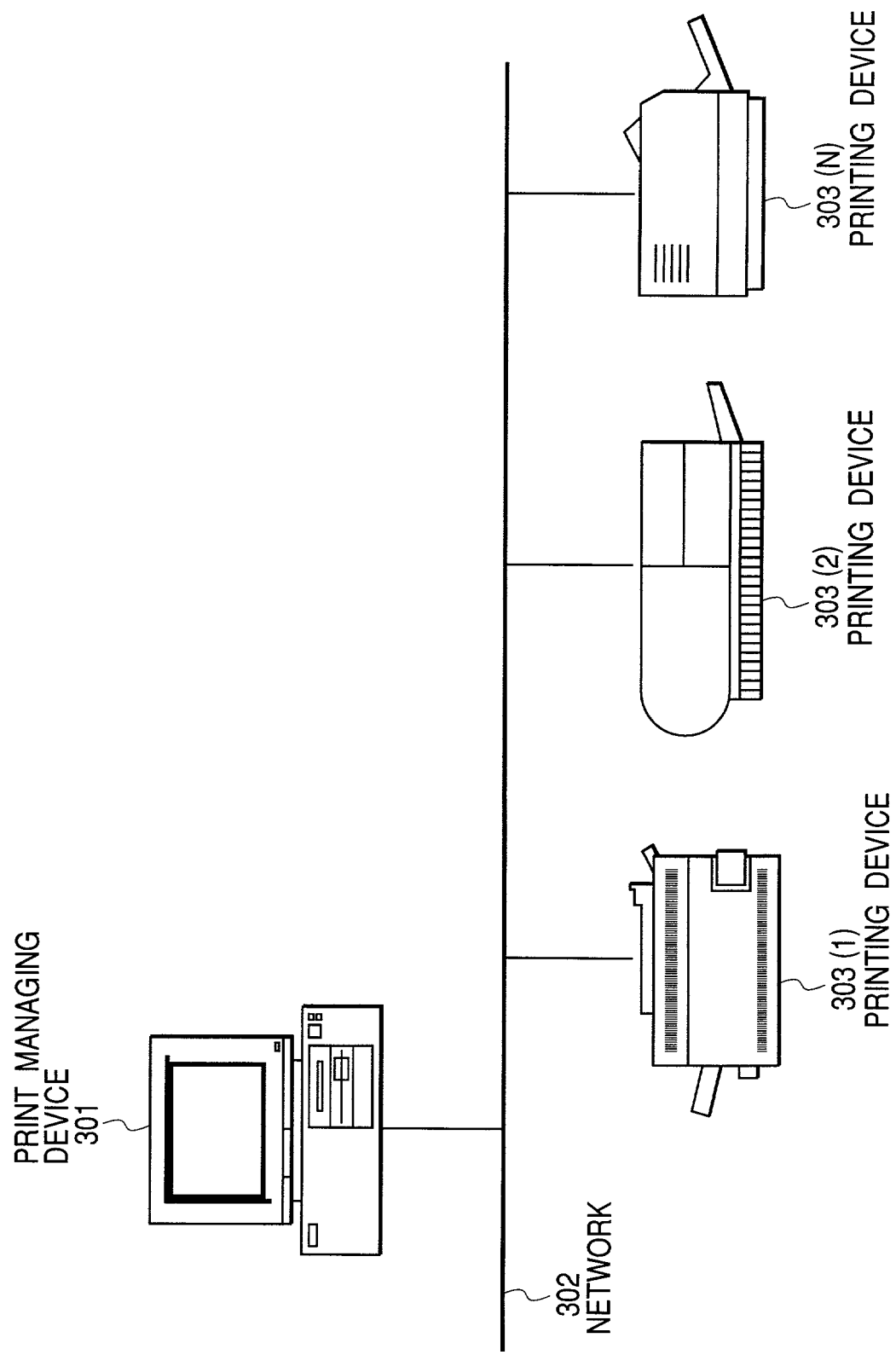
FIG. 3 is a view for explaining a print server 103 in detail.

FIG. 3 is a view for fully explaining the print servers 103. As shown in FIG. 3, a print managing devices 301 corresponding to the print servers 103 are always connected to printing devices 303(1), 303(2), . . . , 303(N) which are managed by the print managing devices 301 via a network 302.

Since the printing devices 303(1), 303(2), . . . , 303(N) have the same construction, the printing device specified among from the plural printing devices 303(1), 303(2), . . . , 303(N) is indicated as "printing device 303(X)". When all of the printing devices 303(1), 303 (2), . . . , 303(N) are indicated, they are referred to merely as "printing devices 303". The network 302 is a general network system. Although LAN (local area network) is used as the network in the illustrated embodiment, any other network system may be used so long as system can always be connected.

Figure 4:
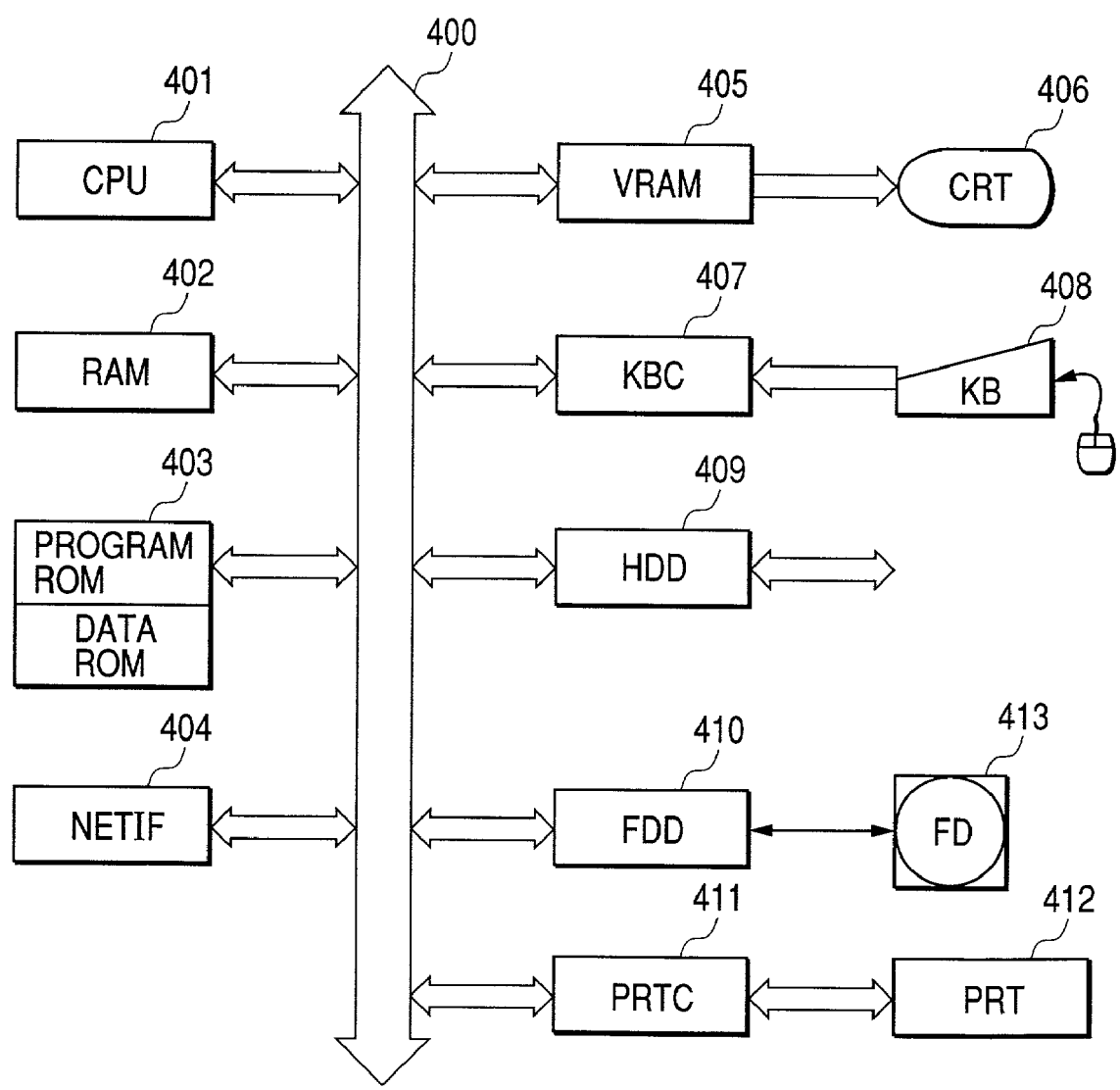
FIG. 4 is a view showing an example of a concrete construction of a print managing device 301.

FIG. 4 is a view showing an example of a concrete construction of the print managing device 301. In FIG. 4, a central processing device (referred to as "CPU" hereinafter) 401 serves to perform calculation/control of an information processing device. A random access memory (referred to as "RAM" hereinafter) 402 acts as a main memory of the CPU 401 to function as an area of an execution program and execution area and data area of the program.

A read-only memory (referred to as "ROM" hereinafter) 403 serves to store an operation processing procedure. The ROM 430 include a program ROM storing basic software (OS) as a system program for effecting equipment control of the information processing device, and a data ROM in which information required for operating the system is stored. In place of the ROM 403, HDD 409 (described later) is used in some cases.

A network interface (NETIF) 404 serves to execute control for effecting data transferring between the information processing devices via the network and diagnosis of a connecting condition. A video RAM (VRAM) 405 serves to develop an image displayed on a screen of a CRT 406 (described later) for indicating the operating condition of the information processing device and control the display.

The reference numeral 406 denotes a displaying device such as display (referred to as "CRT" hereinafter). A controller (referred to as "KBC" hereinafter) 407 serves to control an input signal from an external input device 408. The external input device (referred to as "KB" hereinafter) 408 serves to accept the operation of the user, and, for example, a pointing device such as a keyboard or a mouse is used as the KB.

A hard disk drive (referred to as "HDD" hereinafter) 409 serves to store an application program and various data. The application program according to the illustrated embodiment is a software program for operating various processing means in the illustrated embodiment.

An external input/output device (referred to as "FDD" hereinafter) 410 serves to effect input and output of a removable disk such as a floppy disk drive or a CDROM driver, for example, and is used for reading out the application program from a medium.

A removable data storing device (removable medium) (referred to as "FD" hereinafter) 413 such as a magnetic storing medium (for example, Zip, floppy disk or externally-mounted hard disk), an optical storing medium (for example, CD-ROM), a photo-magnetic storing medium (for example, MO) or a semiconductor storing medium (for example, memory card) is read out by the FDD 410. Incidentally, the application program and data to be stored in the HDD 409 may be stored in the FDD 410.

A controller (referred to as "PRCT" hereinafter) 411 serves to control an output signal to a PRT 412 (described later). For example, an LBP (laser beam printer) is used as the PRT (printing device).

A transferring bus (address bus, data bus, input/output bus and control bus) 400 serves to connecting between various units.

Figure 5:
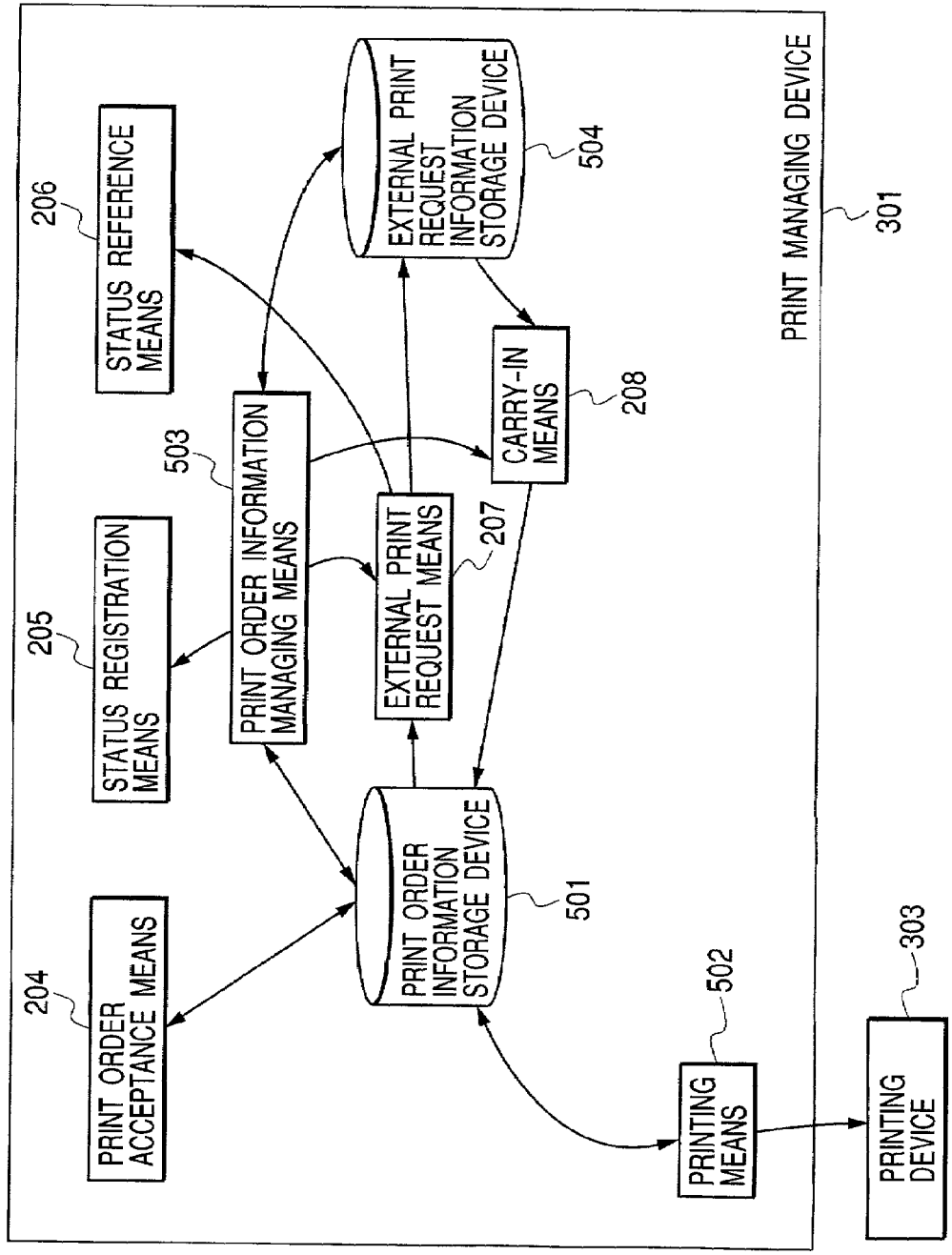
FIG. 5 is a view for explaining a group of processing means and a group of storing means for storing information which are operated in the print managing device 301, summary of a flow of control and information between the grouped processing means and the grouped storing means, and summary of a flow of control and information between the print managing device 301 and a printing device 303.

FIG. 5 is a view for explaining a group of processing means and a group of storing means for storing information which are operated in the print managing device 301, summary of a flow of control and information between the grouped processing means and the grouped storing means, and summary of a flow of control and information between the print managing device 301 and the printing device 303. In FIG. 5, the reference numerals 204, 205, 206, 207, 208, 502 and 503 denote processing means, among which 204, 205, 206, 207 and 208 denote the processing means same as those in FIG. 2. These processing means modules operated as the application program or part of the program read by the ROM 403, HDD 409 or FDD 410 shown in FIG. 4 and developed on the RAM 402 and used in the CPU 401.

In FIG. 5, the reference numeral 501 denotes a print order information storage device; and 504 denote an external print request information storage device. The information is stored by using at least one of the HDD 409, RAM 402 and FDD 410 in the print managing device 301 by using a file system or a database system. Regarding the informations stored in the information storage devices 501, 504, direct access to particular information can be made by a particular key or under a particular condition.

Arrows in FIG. 5 indicate main flows of control and information between the processing means. The flow between the print managing device 301 and the printing device 303 is transferred to the printing device 303 when connected via the network 302 through the NETIF 404. Another flow between the print managing device 301 and the printing device 303 is transferred to the PRT 412, i.e., the printing device 303 via the PRTC 411. Incidentally, the difference between the printing device 303 and the PRT 412 is merely difference of connecting style to the print managing device 301. Namely, when the print managing device 301 is directly connected to the printing device 303, the printing device 303 becomes the same as the PRT 412.

A relationship between the information processing device (print managing device 301) and the processing means and information storage devices therein is developed on the RAM 402 and is transferred to the CPU 401, if necessary, through the KBC 407 on the basis of information or instruction inputted by the user via the KB 408. The informations calculated in the CPU 401 and stored in the required processing means and information storage device are developed on the RAM 402 and transferred to the CPU 401 by the ROM 403, HDD 409, FDD 410 or RAM 402, and, if necessary, a result calculated in the CPU 401 is written in the information storage devices existed in the RAM 402, HDD 409 and FDD 410. Similarly, if necessary, the result calculated in the CPU 401 is displayed on the CRT 406 via the VRAM 405. The transferring between the CPU 401, RAM 402, ROM 403, NETIF 404, VRAM 405, KBC 407, HDD 409 and FDD 410 is effected through the transferring bus 400.

Next, various processing means and information storage devices will be explained concretely. In the illustrated embodiment, the print managing device 301 is manipulated by the operator who executes the print output processing. The print order acceptance means 204 shown in FIG. 5 is processing means operated in the print managing device 301 and has a function for setting number of order in order number of order information with respect to the ordered print order data and for setting the number of order and print data number in order number of print information and for storing them in the print order information storage device 501 in the print managing device 301 with association with the print data.

The order information is information including items such as a print managing device number, an orderer number, an order date, print status and the like based on an order number as a key. The print information is information regarding including items such as a print service type, a print part number, an order part number, a page number, a printer number and the like based on the order number and print data number as a key. A plurality of print informations can be combined with single order information. The print order information storage device 501 has a function for storing a plurality of order informations.

The print order acceptance means 204 is automatically started by an external means or started by manipulation of the operator. On the basis of the operator's instruction, the printing means 502 has a function for extracting the print data stored in the print order information storage device 501 and transferring it to the printing device 303(X) and for instructing the print to the printing device 303(X).

The print order information managing means 503 has a function in which the operator can browse the status of the print order data stored in the print order information storage device 501 by manipulating it by the operator.

On the basis of the operator's instruction, the status registration means 205 registers the vacant status (receipt acceptance, temporary interruption and the like) of the printing devices 303 in the printing device vacant status information storing portion 210 in the database 203 of the center server 102 and registers the processing status (print waiting, print finish and the like) of the ordered print data in the print order information storing portion 209 in the database 203 of the center server 102.

The external print request means 207 started by the print order information managing means 503 on the basis of the operator's instruction acquires the printing device vacant status information from the printing device vacant status information storing portion 210 in the database 203 of the center server 102 by using the status retrieval means 206 and selects the print server 103(X) to which the external print can be requested and brings the print order data selected among from the print order data stored in the print order information storage device 501 and compresses it as a package file and sends the file to the selected print server 103(X) by using a known electronic mail system and stores the external print request information in the external print request information storage device 504. The print order information managing means 503 displays the fact that the print order data is "external print request" status, thereby limiting the printing processing of the print order data.

The printing device vacant status information is information including items such as printer status, e-mail address and the like based on the print managing device number and printer code as a key. The external print request information is information including items such as a requester print managing device number, a request date and the like based on the order number as a key. The external print request information storage device 504 has a function for storing a plurality of print order data and external print request informations brought from the print order information storage device 501.

The carry-in means 208 started by the print order information managing means 503 on the basis of the operator's instruction has a function for solving and developing data sent by the known electronic mail system and for storing the print order data stored in the external print request information storage device 504 in the print order information storage device 501.

Figure 6:
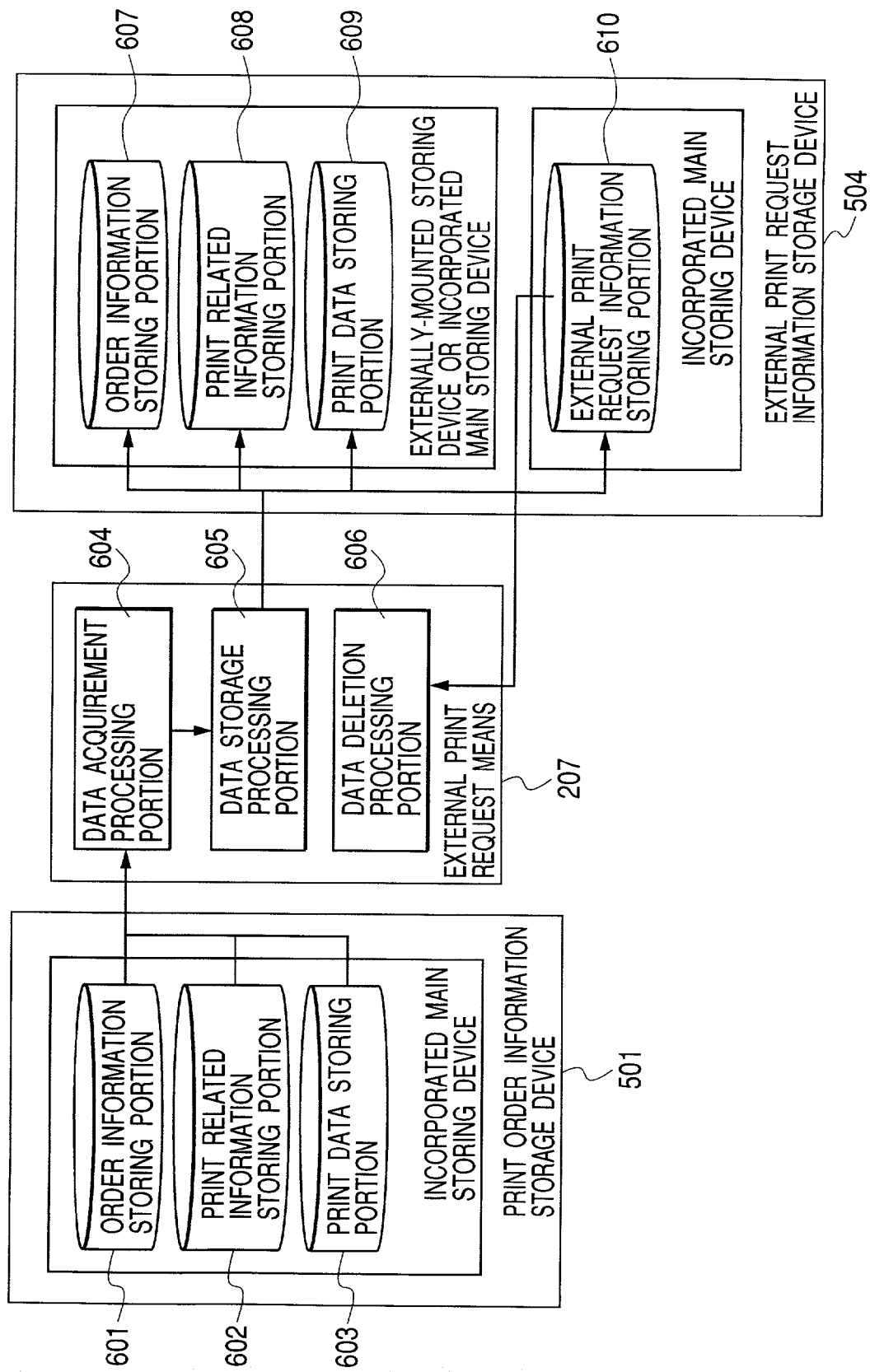
FIG. 6 is a conceptional view for explaining external print request processing and for fully explaining a print order information storage device 501, external print request means 207 and an external print request information storage device 504.

FIG. 6 is a conceptional view for explaining the external print request processing and for fully explaining the print order information storage device 501, external print request means 207 and external print request information storage device 504 shown in FIG. 5. The print order information storage device 501 is constituted by an order information storing portion 601 having format such as the order number, print managing device number, orderer number, order date, print status and the like in the HDD 409 and storing the order information, a print related information storing portion 602 having format such as the order number, print data number, print service type, print part number, order part number, page number, printer number and the like and storing the print information, and a print data storing portion 603 storing the print data to be print-outputted by the printing devices 303.

The external print request means 207 is constituted by a data acquirement processing means 604 for providing a program available by reading-in from the program ROM 403 to the RAM 402, a data storage processing means 605, and a data deletion processing means 606 for deleting the external print information from an external print request information storing portion 610 in an external print request information storage device 504 which will be described later.

The external print request information storage device 504 is constituted by an order information storing portion 607 having format such as the order number, print managing device number, orderer number, order date, print status and the like in the FDD 410 or the HDD 409 in which the print order data extracted from the print order information storage device 501 by the data acquirement processing means 604 is stored by the data storage processing means 605 and storing information, a print related information storing portion 608 having format such as the order number, print data number, print service type, print part number, order part number, page number, printer number and the like and storing information, and an external print request information storing portion 610 having format such as the order number, requester print managing device number, request date and the like in the HDD 409 and storing information of the external-requested data.

Figures 18, 18A:
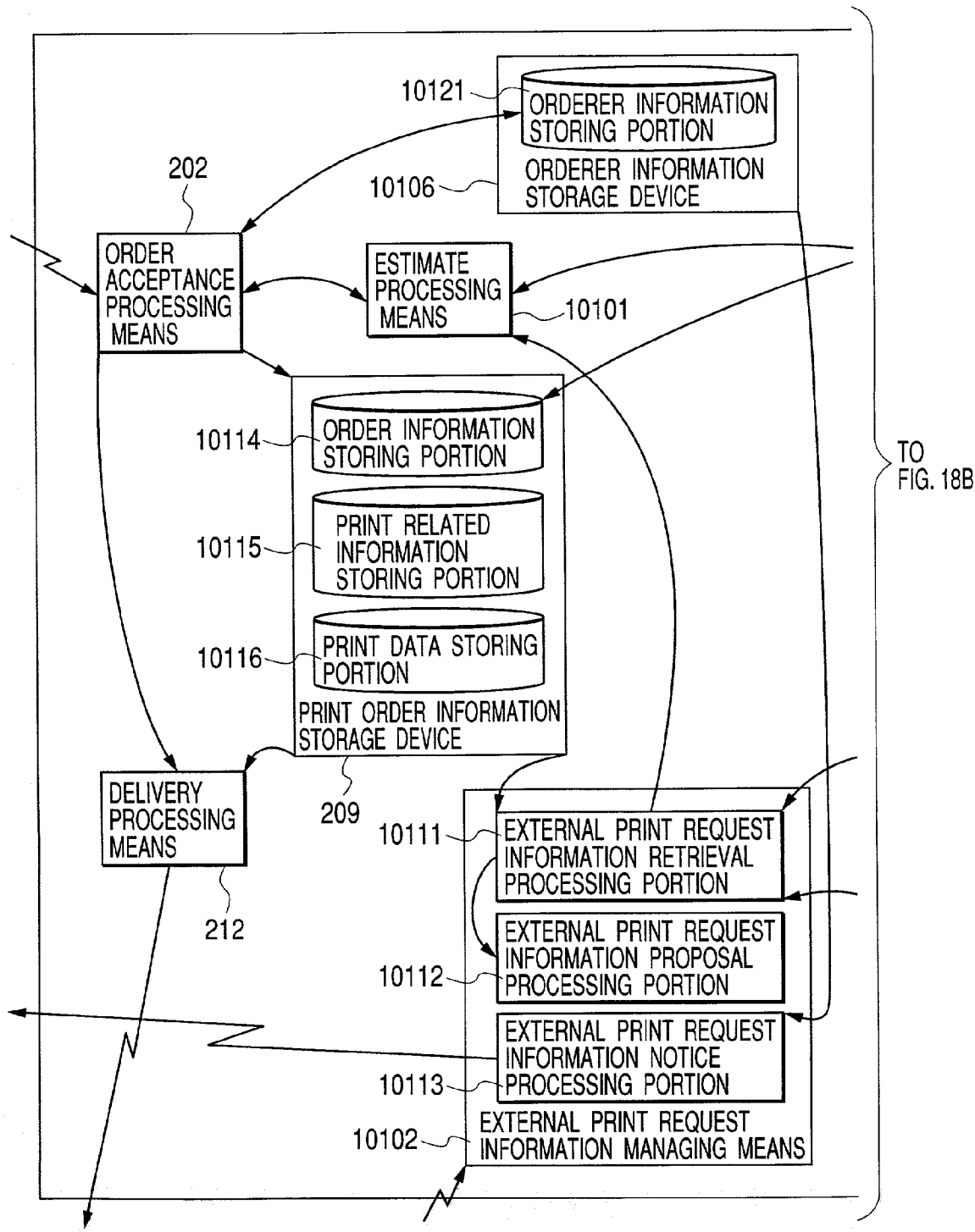
FIG. 18 is of FIGS. 18A and 18B showing a view for explaining a group of processing means and a group of storing means for storing information which are operated in a central managing device 201, and summary of a flow of control and information between the grouped processing means and the grouped storing means.
Figure 18B:
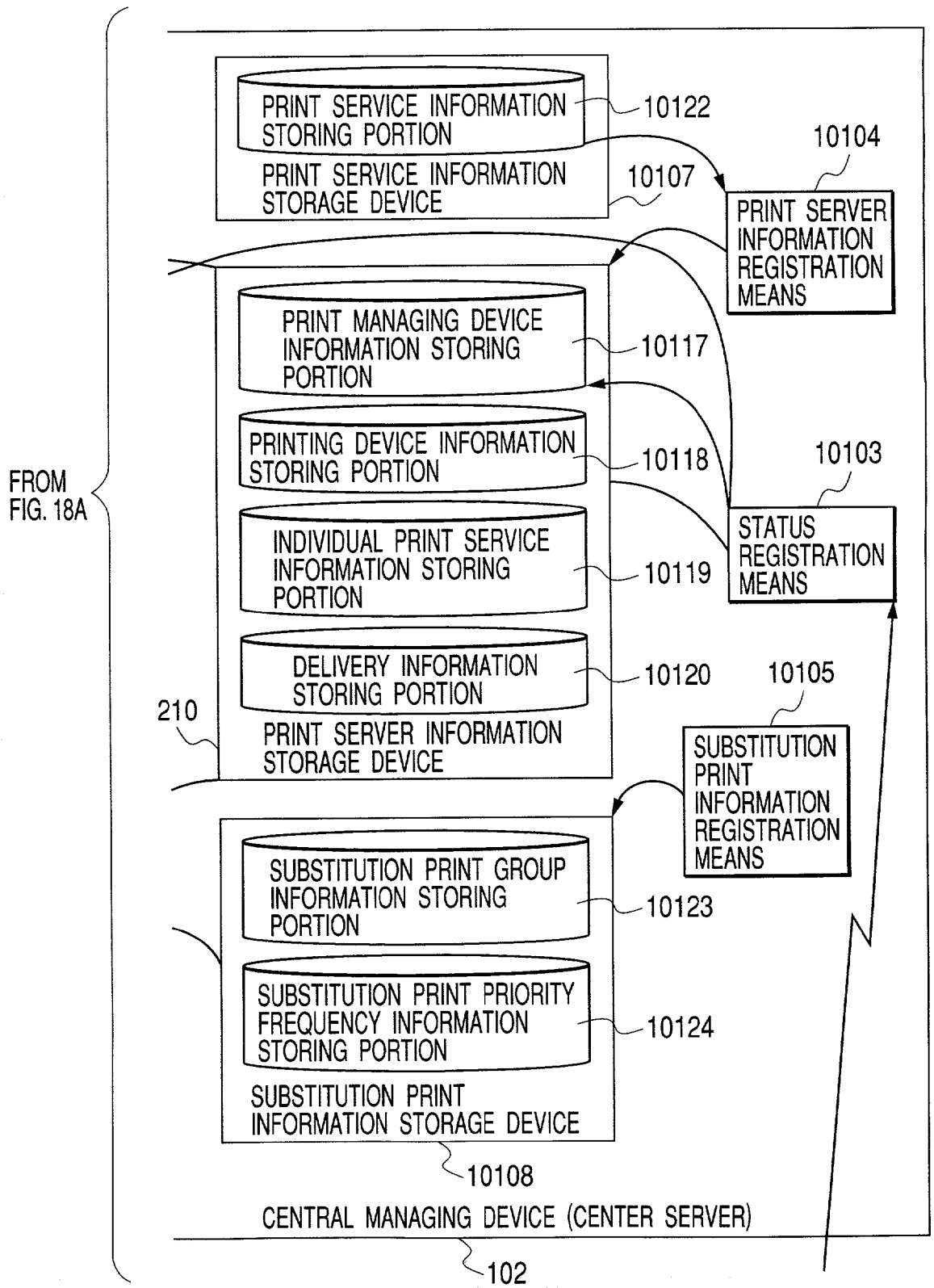

FIGS. 18A and 18B are views for explaining a group of processing means and a group of storing means for storing information which are operated in the central managing device 102 as the center server, and summary of a flow of control and information between the grouped processing means and the grouped storing means. In FIGS. 18A and 18B, the reference numerals 202, 211, 10101, 10102, 10103, 10104 and 10105 denote processing means, among which 202 denotes the processing means same as that in FIG. 2. These processing means modules operated as the application program or part of the program read by the ROM 403, HDD 409 or FDD 410 shown in FIG. 4 and developed on the RAM 402 and used in the CPU 401.

In FIGS. 18A and 18B, the reference numeral 209 denotes a print order information storage device; 210 denotes a print server information storage device; 10106 denotes an orderer information storage device; 10107 denotes a print service information storage device; and 10108 denotes a substitution print information storage device. The information is stored by using at least one of the HDD 409, RAM 402 and FDD 410 in the print managing device 301 by using a file system or a database system. Regarding the informations stored in the information storage devices 209, 210, 10106, 10107 and 10108, direct access to particular information can be made by a particular key or under a particular condition.

Arrows in FIGS. 18A and 18B indicate main flows of control and information between the processing means.

A relationship between the information processing device (central managing device 102) and the processing means and information storage devices therein is developed on the RAM 402 and is transferred to the CPU 401, if necessary, through the KBC 407 on the basis of information or instruction inputted by the user via the KB 408. The informations calculated in the CPU 401 and stored in the required processing means and information storage device are developed on the RAM 402 and transferred to the CPU 401 by the ROM 403, HDD 409, FDD 410 or RAM 402, and, if necessary, a result calculated in the CPU 401 is written in the information storage devices existed in the RAM 402, HDD 409 and FDD 410. Similarly, if necessary, the result calculated in the CPU 401 is displayed on the CRT 406 via the VRAM 405. The transferring between the CPU 401, RAM 402, ROM 403, NETIF 404, VRAM 405, KBC 407, HDD 409 and FDD 410 is effected through the transferring bus 400.

Next, various processing means and information storage devices will be explained concretely. The order acceptance processing means 202 shown in FIGS. 18A and 18B are processing means operated in the central managing device 102 and has a function for setting number of order in order number of order information with respect to the ordered print order data and for setting the number of order and print data number in order number of print related information and for storing them in the print order information storage device 209 in the central managing device 102 with association with the print data.

The order information is information including items such as a print managing device number, an orderer number, an order date, print status, a print charge, a receiving method, a destination name, a destination address, a destination TEL number, a delivery charge and the like based on an order number as a key.

The print related information is information regarding including items such as a print service type, a print part number, an order part number, a page number, a printer number, print parameter and the like based on the order number and print data number as a key. A plurality of print related informations can be combined with single order information. The print order information storage device 209 has a function for storing a plurality of order informations.

The print order acceptance means 202 is automatically started by an external means. Transmission processing means 211 automatically started on the basis of instruction from the order acceptance processing means 202 or instruction from the external means has a function for extracting the print data stored in the print order information storage device 209 and transferring it to the print managing device 301(X).

Estimate processing means 10101 is started on the basis of instruction from the order acceptance processing means 202 or external print request information managing means 10102 and has a function for calculating estimate of the print charge and the delivery charge for the ordered contents from a print unit-cost and a basic delivery charge of an individual print service information storing portion 10119 in the print server information storage device 210 and a changed charge of a delivery information storing portion 10120 on the basis of the order information.

The external print request information managing means 10102 is automatically started on the basis of instruction from the external print request candidate reference means 206 in the print server 103(X) when the print server 103(X) of external print request destination is retrieved and is constituted by an external print request information retrieval processing portion 10111 for acquiring the order information from an order information storing portion 10114 in the print order information storage device 209 on the basis of the order number and print data number transferred upon starting and or acquiring the print related information from a print related information storing portion 10115 in the print order information storage device 209 and for acquiring the candidate of the print managing devices capable of effecting substitution print from a print managing device information storing portion 10117 and a printing device information storing portion 10118 in the print server information storage device 210 and for effecting estimate processing by using the estimate processing means 10101 and for retrieving and acquiring a (priority) order of the candidates to which the substitution print is requested from a substitution print group information storing portion 10123 (for storing substitution print group information) and a substitution print priority frequency information storing portion 10124 (for storing substitution print priority frequency information) in a substitution print information storage device 10108, an external print request information proposal processing portion 10112, and an external print request information notice processing portion 10113.

The substitution print group information is information regarding a substitution print group including items such as a group name, a company, a substitution print cost disuse flag and the like based on a print server group number as a key and adapted to divide the print managing devices for the substitution print into groups.

The substitution print priority frequency information is information regarding priority frequency (degree) including items such as the print server group number, substitution print condition priority frequency (same group, time limit, cost, area and the like) and the like based on the print managing device number as a key and adapted to be used when the print managing device for effecting the substitution print is selected. The orderer information is information regarding the orderer including items such as an orderer name, e-mail address, TEL number, effective term and the like based on the orderer number as a key.

Status registration means 10103 is automatically started on the basis of instruction from status registration means 205 in the print server 103(X) and has a function for setting status regarding the print managing device such as "under service interruption" in the print managing device information storing portion 10117 in the print server information storage device 210 and for setting status regarding the printing device such as "under operation" in the printing device information storing portion 10118 and for setting status regarding the print processing such as "print completion" in the order information storing portion 10114 in the print order information storage device 209.

Print server information registration means 10104 started on the basis of the operator's instruction has a processing function for storing the print managing device information regarding the print managing devices 301 of the print servers 103 in the print managing device information storing portion 10117 in the print server information storage device 210 and for storing the printing device information regarding the printing devices 303 of the print servers 103 in the printing device information storing portion 10118 in the print server information storage device 210 and for extracting the print service information suitable for the print server 103(X) from a print service information storing portion 10122 in a print service information storage device 10107 and for storing it as individual print service information in the individual print service information storing portion 10119 in the print server information storage device 210 and for storing delivery charge information of the print server 103(X) in a delivery information storing portion 10120 in the print server information storage device 210.

The print managing device information is information regarding the print managing device including items such as print managing device status, e-mail address, address, TEL number, name, representative name, delivery possible flag, provided service type and the like based on the print managing device number as a key.

The printing device information is information regarding the printing device including items such as printer status, print possible service type and the like based on the print managing device number and the printing device number as a key. The print service information is information regarding the basic print service including items such as service name, basic print parameter, print possible printing device number and the like based on the print service number as a key.

The individual print service information is information regarding the print service including items such as service name, time limit, print parameter, print unit cost, basic delivery charge and the like based on the print managing device number and the print service number as a key. The delivery charge information is information including delivery charge changing factors, changed values, changed charges and the like set in the respective print managing devices.

FIG. 7 is a view showing format of the external print request information storing portion 610. An external print request information table 700 is constituted by an order number 701 for storing the order number of the print order data regarding the external print request, a client print managing device number 702 for judging which print managing device requests the print, a request date 703 for storing date on which the external print request processing is effected, and comment 704 for storing any information regarding the external print request.

FIG. 8 is a view showing database image of the external print request information storing portion 610 and shows file image 800 when information regarding the format stored in the database is developed as a file for clarifying the format.

FIG. 9 is a view showing format of the order information storing portion 601 in the print order information storage device 501, order information storing portion 607 in the external print request information storage device 504 and order information storing portion 10114 in print order information storage device 209 in the central managing device 102. One table is formed for one order unit. The difference between 601 and 607 is that the storing portion 601 is existed in the HDD 409, whereas, the storing portion 607 is extracted from the storing portion 601 and then is stored in the HDD 409 or the FD 413. The difference between 10114 and 601 is that the storing portion 10114 is stored in the central managing device 102, whereas, the storing portion 601 corresponds to a storing portion extracted and transmitted from the storing portion 10114 of the central managing device 102 and stored in the print managing device 301. An order information table 900 is constituted by order number 901 for storing the order number of the print order data, print managing device number 902 for judging which print managing device receives the print order, orderer number 903 for discriminating the orderer, order date 904 for storing date on which the order is received, print status 905 for storing status such as "print waiting", "print finish" and "external print request" in order to judge the status of the print processing, price (print charge) 906 for storing price when the charge for the print order is paid, receiving method 607 for storing a receiving method such as delivery or receipt on-shop, destination name 908 for storing delivery destination upon delivery, destination address 909 for storing address of delivery destination, destination TEL number 910 for storing a telephone number of delivery destination, and delivery charge 911 for storing price when charge for delivery is paid.

FIG. 10 is a view showing format of the print related information storing portion 602 in the print order information storage device 501, print related information storing portion 608 in the external print request information storage device 504 and print related information storing portion 10115 in print order information storage device 209 in the central managing device 102. One table is formed for one order unit. The difference between 602 and 608 is that the storing portion 602 is existed in the HDD 409, whereas, the storing portion 608 is extracted from the storing portion 602 and then is stored in the HDD 409 or the FD 413. The difference between 10115 and 602 is that the storing portion 10115 is stored in the central managing device 102, whereas, the storing portion 602 corresponds to a storing portion extracted and transmitted from the storing portion 10115 of the central managing device 102 and stored in the print managing device 301. A print related information table 1000 is constituted by order number 1001 for storing the order number of the print order data combined with the order number 901 of the order information table 900, print data number 1002 capable of including plural print data for one order unit and adapted to store numbers or discriminating the print data, print service type 1003 for discriminating or determining how margin is used in the printing of the print data, print part number 1004 for storing the number of parts (prints) which were actually printed, order part number 1005 for storing the number of print order parts (prints) which were requested, page number 1006 for storing the number of pages which constitutes a document of the print data, printer number 1007 for discriminating the printer used in print output, and print parameter 1008 for storing information such as setting of the printer and margin of the print data.

FIG. 11 is a view showing general format of the printing device vacant status information storing portion 210 in the database 203 of the center server 102. The formats corresponding to, the number of printing devices are formed. A printing device vacant status information table 1100 is constituted by print managing device number 1101, printer code 1102 for discriminating the printing device to be connected to the print managing device, printer status 1103 for registering vacant status (available/non-available condition) of the printing device, and e-mail address 1104 to which the external print request and the finish of the requested processing are informed.

Next, applicable formats corresponding to FIG. 11 and shown in FIGS. 19 to 26 will be explained.

FIG. 19 is a view showing format of the print managing device information storing portion 10117 in the print server information storage device 210. The formats corresponding to the number of print managing devices are formed. A print managing device information table 10200 is constituted by print managing device number 10201, print managing device status 10202 for storing status such as "under operation" and "under interruption" in order to judge whether the print managing device is available or not, e-mail address 10203 to which the external print request and the finish of the requested processing are informed, address 10204 for storing address, TEL number 10205 for telephone communication, name 10206 for storing a shop name, representative name 10207 for storing the representative of the shop, delivery possible flag 10208 storing whether delivery service is possible or not, and provided service type 10209 for storing a list of print services to be provided.

FIG. 20 is a view showing format of the printing device information storing portion 10118 in the print server information storage device 210 of the central managing device 102. The formats corresponding to the number of printing devices are formed. A printing device information table 10300 is constituted by print managing device number 10301, printing device number 10302 for registering a number inherent to the printing device, printer status 10303 for registering vacant status (available/non-available condition) of the printing device, and print possible service type 10304 for storing a list of print services which can be printed.

FIG. 21 is a view showing format of an orderer information storing portion 10121 in an orderer information storage device 10106 of the central managing device 102. The formats corresponding to the number of registered orderers are formed. An orderer information table 10400 is constituted by orderer number 10401, orderer name 10402 for storing the name of orderer, e-mail address 10403 to which the fact that the substitution print regarding the external print request processing is effected is informed, TEL number 10404 or telephone communication to the orderer, and effective term 10405 for registering an effective term of the orderer information.

FIG. 22 is a view showing format of the individual print service information storing portion 10119 in the print server information storage device 210 of the central managing device 102. The formats corresponding to the number of the print service types executed for each print managing device are formed. An individual print service information table 10500 is constituted by print managing device number 10501, print service number 10502, service name 10503 for storing the name of the print service effected by the print managing device, limit time 10504 for storing the number of dates required for completion of the print service, print parameter 10505 for storing the setting of the printer in the print managing device and margin of the print data, print unit cost 10506 for storing unit cost when the print charge is calculated, and basic delivery charge 10507 for storing basic charge when the delivery charge is calculated.

FIG. 23 is a view showing a constructional image of the delivery information storing portion 10120 in the print server information storage device 210 of the central managing device 102. The formats corresponding to the number of factors for changing the delivery charge for each print managing device are formed. A delivery charge information table image 10600 is constituted by print managing device number 10601, delivery charge changing factor 10602 representing items of factor (area, magnitude, weight, express delivery and the like) for changing the delivery charge, changed value 10603 representing values (for example, regarding the area, Kantoh area, Hokkaido area, Kyushu area or the like) with respect to the items of factor for changing the delivery charge, and changed charge 10604 representing increase/decrease of the delivery charge with respect to the changed value.

FIG. 24 is a view showing format of the print service information storing portion 10122 in the print service information storage device 10107 of the central managing device 102. The formats corresponding to the number of basic print services which can be effected by the respective print servers in the system are formed. Default values of informations of the respective print managing devices stored in the individual print service information table 10500 of the individual print service information storing portion 10119 in the print server information storage device 210 of the central managing device 102 are stored. A print service information table 10700 is constituted by print service number 10701, service name 10702 which is the name of default service, basic print parameter 10703 for storing default information such as general-purpose setting of the printer, margin of the print data and the like, and print possible printing device number 10704 for storing a list of the printers capable of printing the print service.

FIG. 25 is a view showing format of the substitution print group information storing portion 10123 in the substitution print information storage device 10108 of the central managing device 102. The formats corresponding to the number of groups for dividing the print servers into groups are formed. A substitution print group information table 10800 is constituted by print server group number 10801 for discriminating a print server group which is used for the purpose for determining that cost regarding the substitution print in the external print request processing is not calculated in the same company or the same group (no charge between individual print managing devices), group name 10802 for storing the name of the print server group, company 10803 for storing company information when each of companies managing the print managing devices is grouped, and substitution print cost disuse flag 10804 for determining that the cost is not calculated in the same group when the print managing device which performs the substitution print in the external print request processing is retrieved by the center server.

FIG. 26 is a view showing a constructional image of the substitution print priority frequency information storing portion 10124 in the substitution print information storage device 10108 of the central managing device 102. The formats corresponding to the number of the print managing devices are formed. A substitution print priority frequency information table image 10900 is constituted by print managing device number 10901, print server group number 10902 for discriminating the belonging print server group, and substitution print condition priority order (in the illustrated embodiment, same group 10903 for judging whether the print server is included in the same print server group or not, time limit 10904 for giving preference or priority to a print server having nearest time limit, cost 10905 for giving preference to a print server having lowest cost, and area 10906 for giving preference to a nearest area in topography are used as judging references).

FIG. 12 is a conceptional view for explaining carry-in processing and illustrates the external print request information storage device 504, carry-in means 208 and print order information storage device 501 shown in FIG. 5 in detail. The external print request information storage device 504 is constituted by the order information storing portion 607 having format such as order number, print managing device number, orderer number, order date and print status of the print data subjected to external print request from other print managing device and adapted to store the order information, the print related information storing portion 608 having format such as order number, print data number, print service type, print part number, order part number page number and printer number and adapted to store the print information, and the print data storing portion 609 for storing the print data print-outputted by the printing devices 303.

The carry-in means 208 is constituted by a data acquirement processing portion 1201 which is a program available by reading it from the program ROM 403 to the RAM 402, and a data storage processing portion 1202.

The print order information storage device 501 is constituted by the order information storing portion 601 having format such as order number, print managing device number, orderer number, order date and print status and adapted to store the order information, the print related information storing portion 602 having format such as order number, print data number, print service type, print part number, order part number, page number and printer number and adapted to store the print information, and the print data storing portion 603 for storing the print data print-outputted by the printing devices 303.

FIG. 13 shows an example of a screen image manipulated when the operator performs the external print request processing via the external print request means 207. When such a screen is started, inquiry is effected to the center server, and, when the screen is started, information regarding the client print managing device automatically selected. The Web browser displayed when the operator clearly acquires the list of shops for the external print request recommended by the center server is started by a "server information reference" button included in the screen image of FIG. 13. Further, when the operator informs the center server of the fact that the external print processing is requested to the orderer, such informing is effected by depressing a "inform to client" button on the screen image of FIG. 13. Further, FIG. 14 shows an example of a screen image manipulated by the operator when the operator carries out carry-in processing via the carry-in means 208.

Figure 15A:
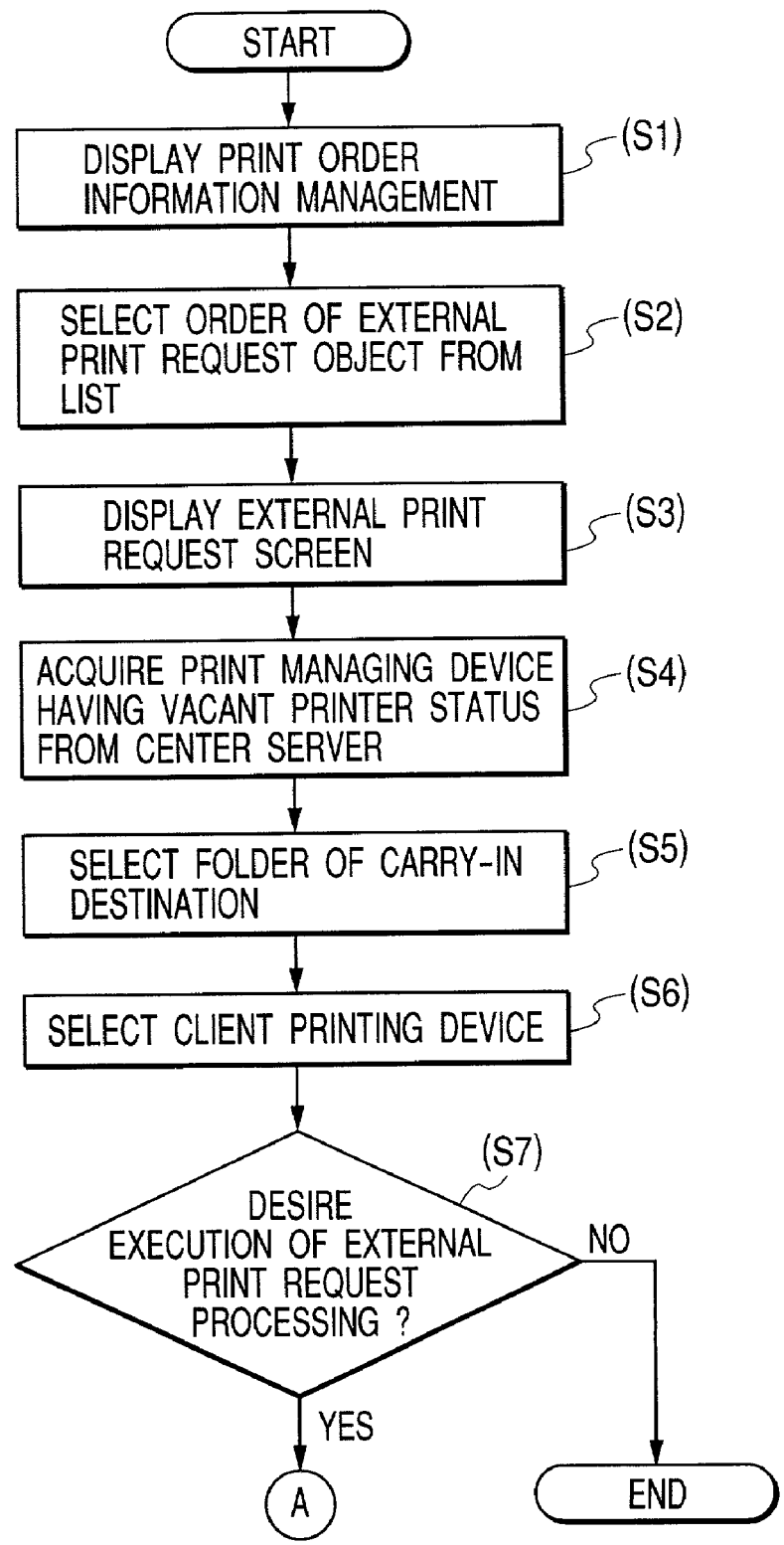
FIGS. 15A, 15B and 15C are a flow chart showing processing operations upon external print request.
Figure 15B:
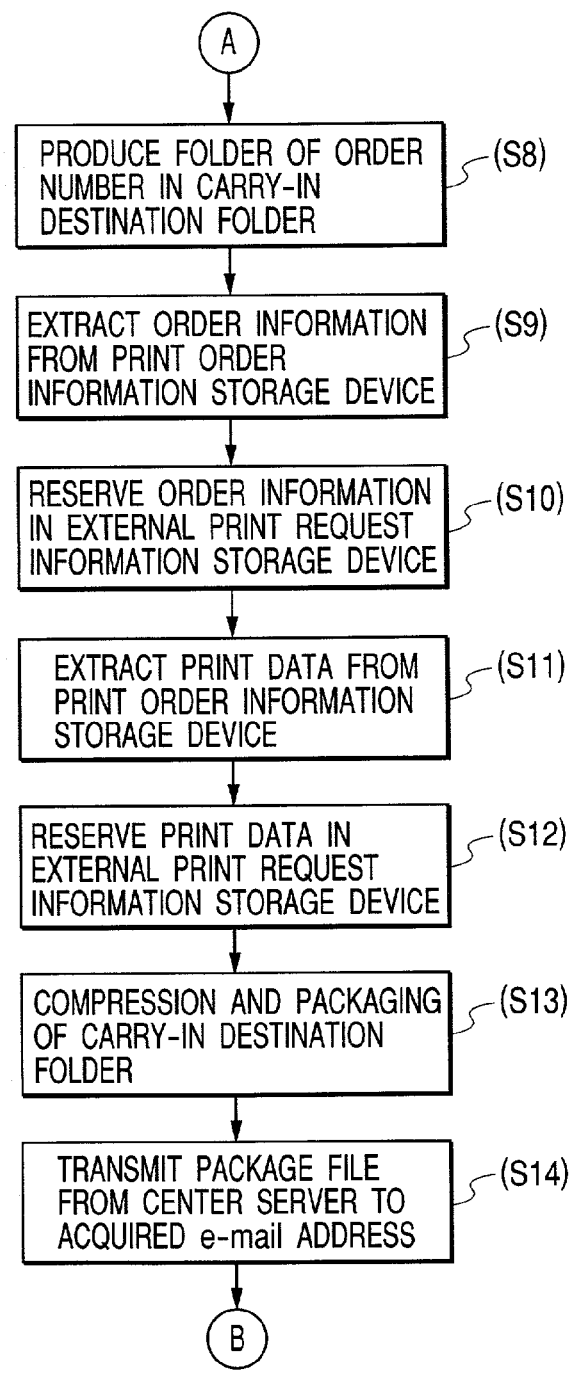
Figure 15C:
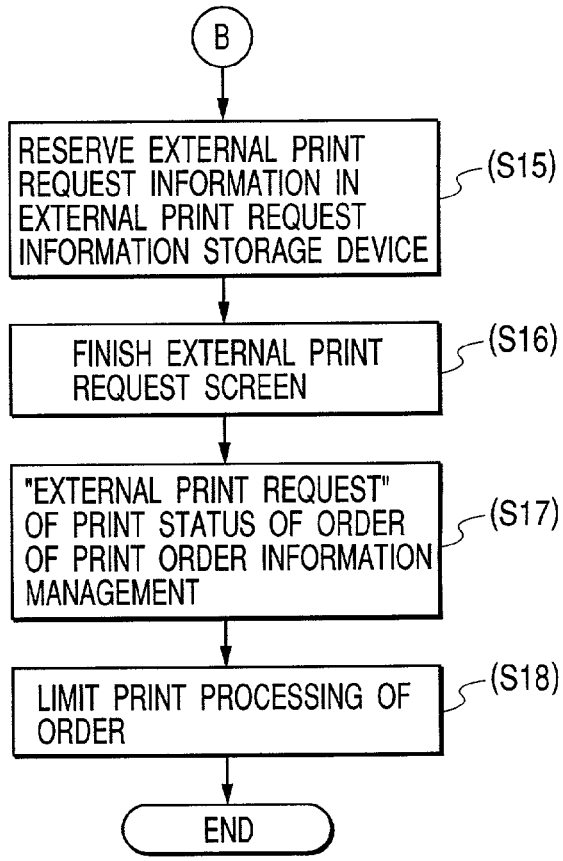
Figure 16A:
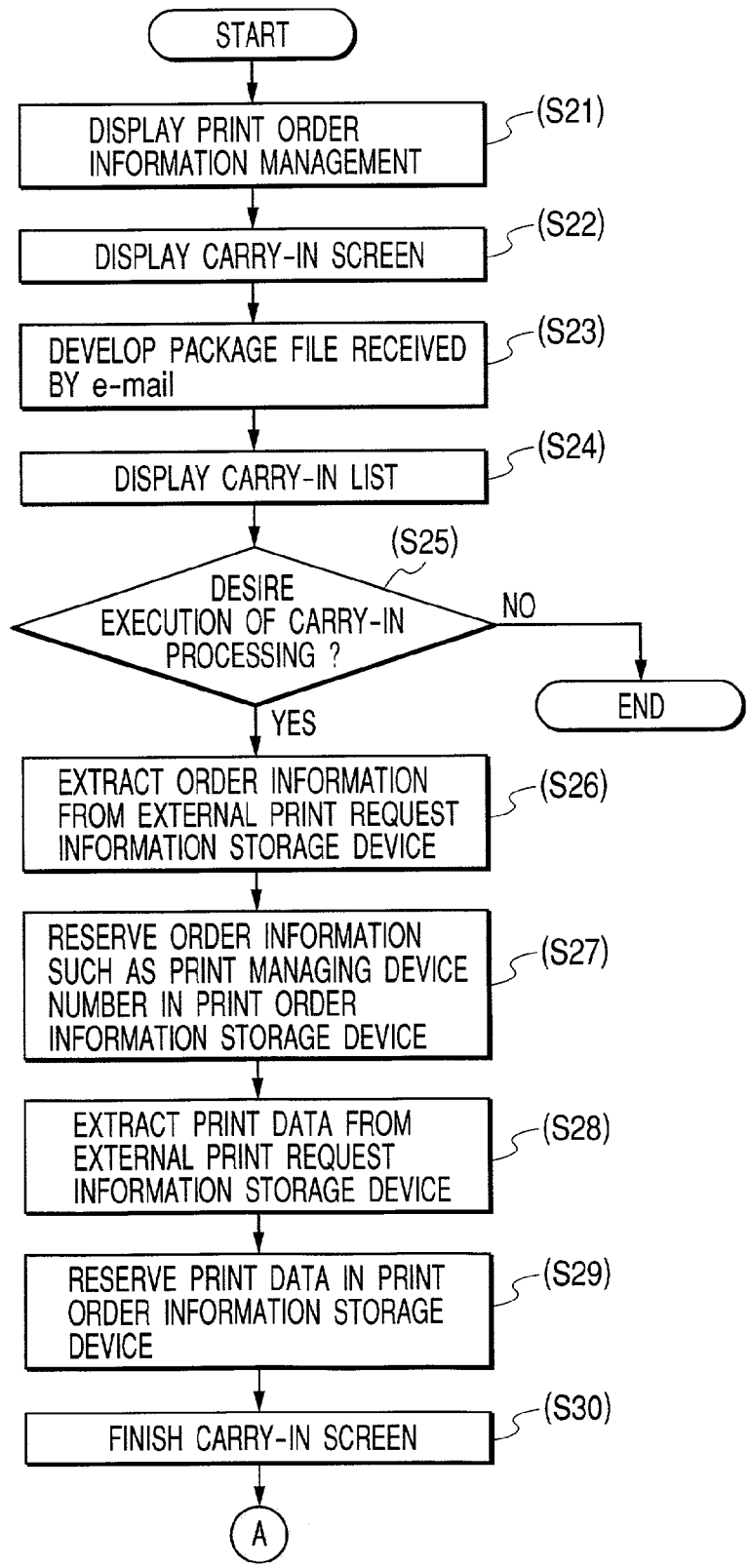
Figure 17:
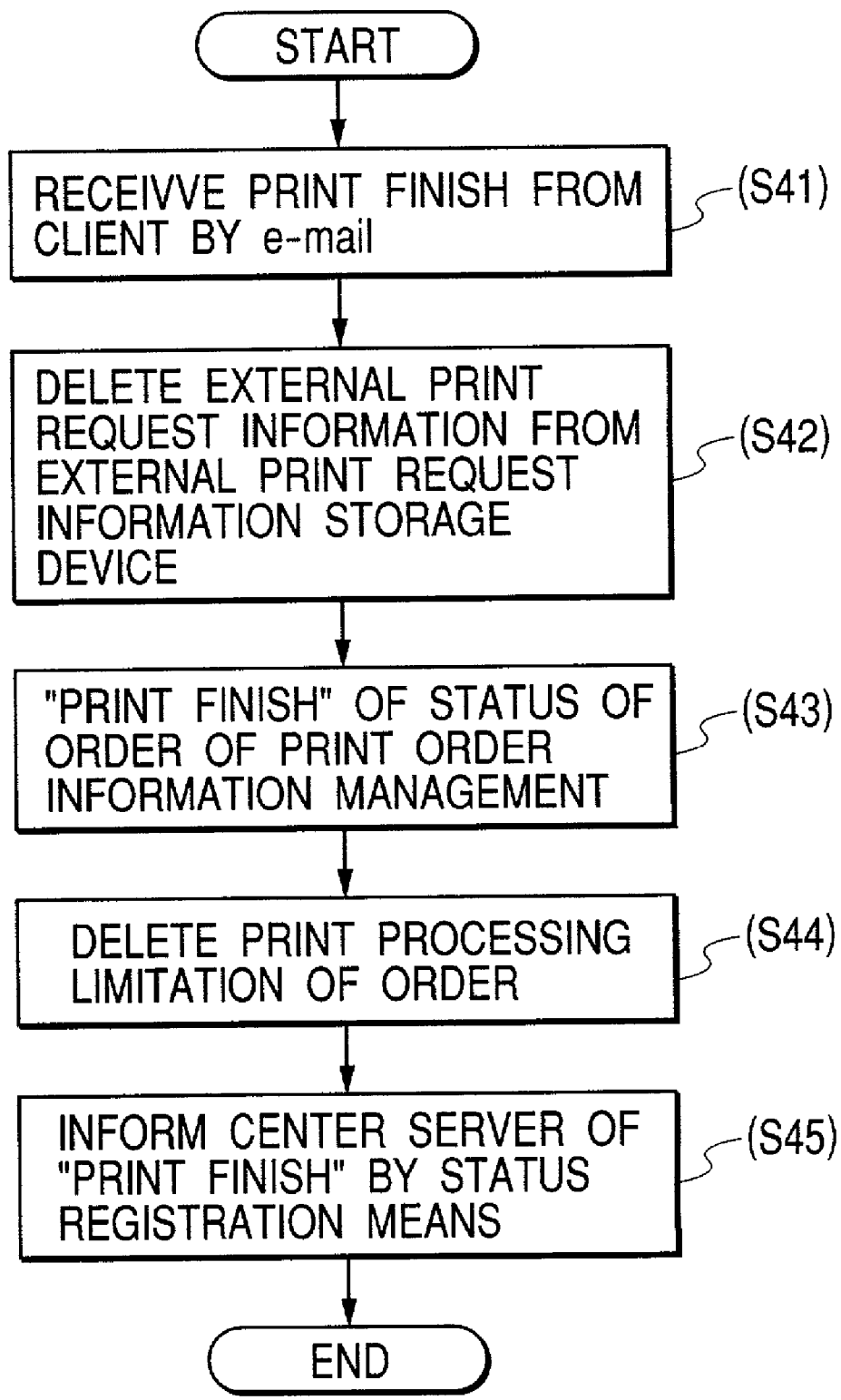
FIG. 17 is a flow chart showing a finish recognition processing operation when the fact that the print is finished is informed from other print managing device to which the external print is requested.
Figure 27A:
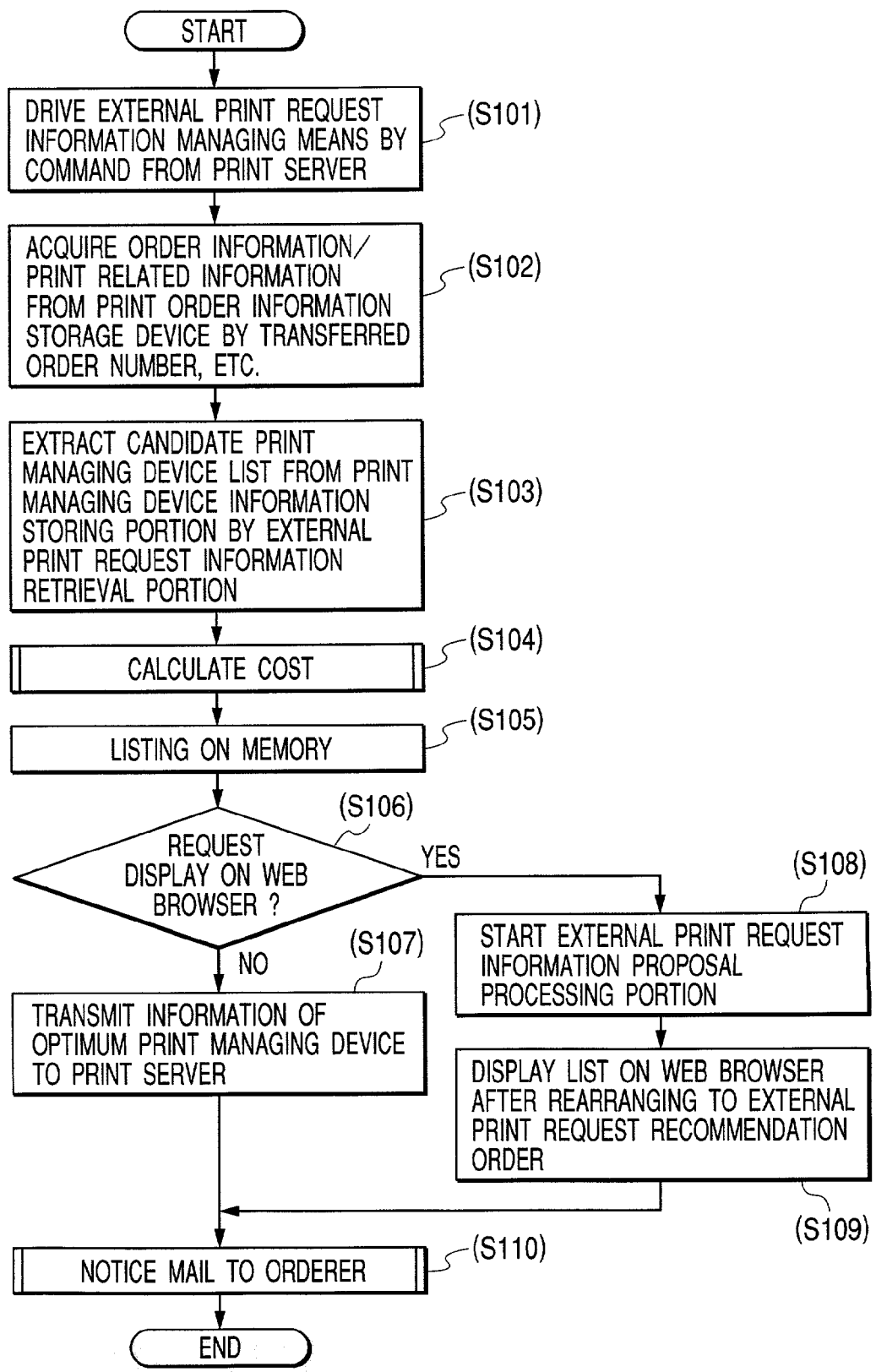
FIGS. 27A, 27B and 27C are a flow chart showing a processing operation at a center server side when a print managing device to which substitution print is requested upon external print request in a print server is acquired from a center server.
Figure 27B:
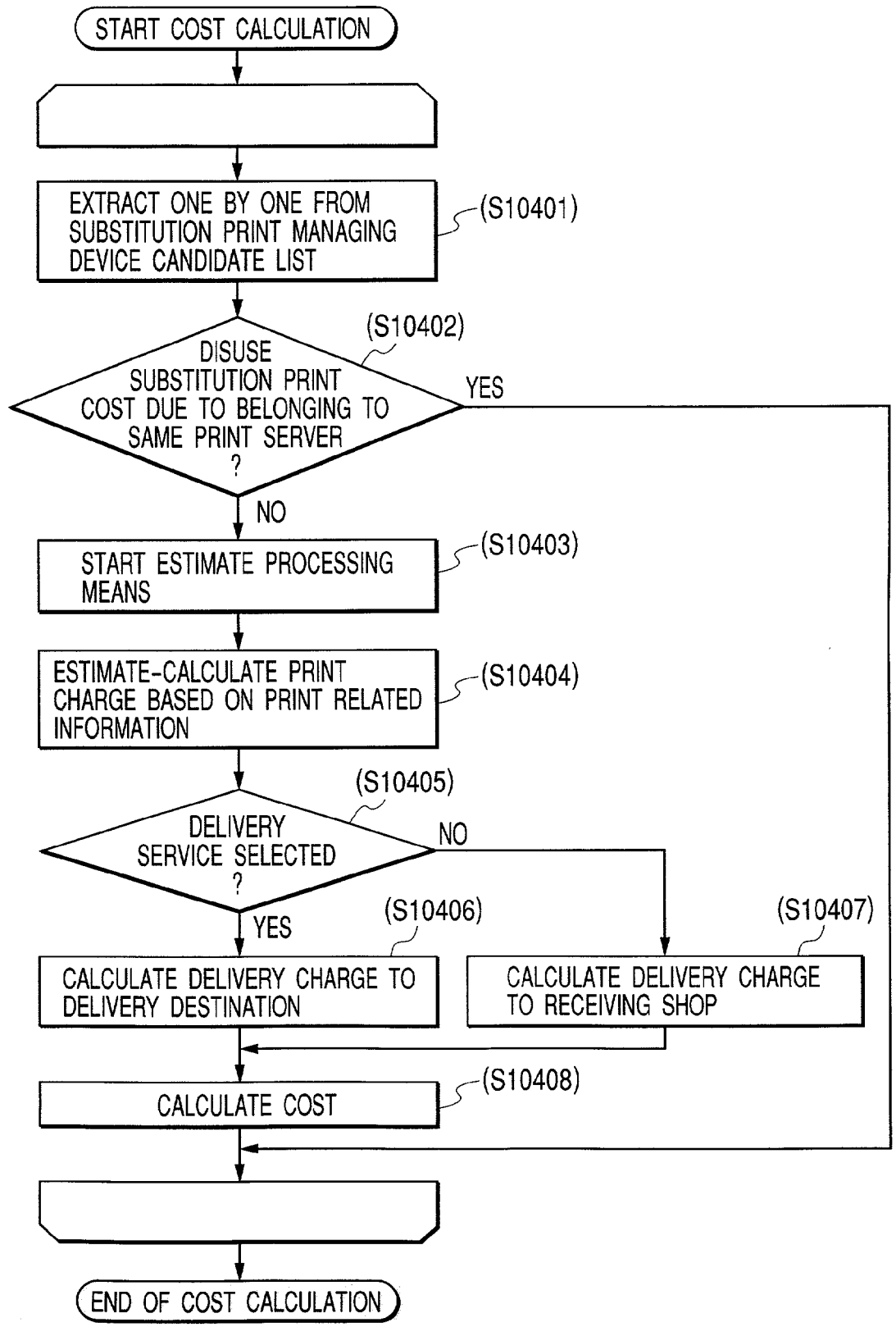
Figure 27C:
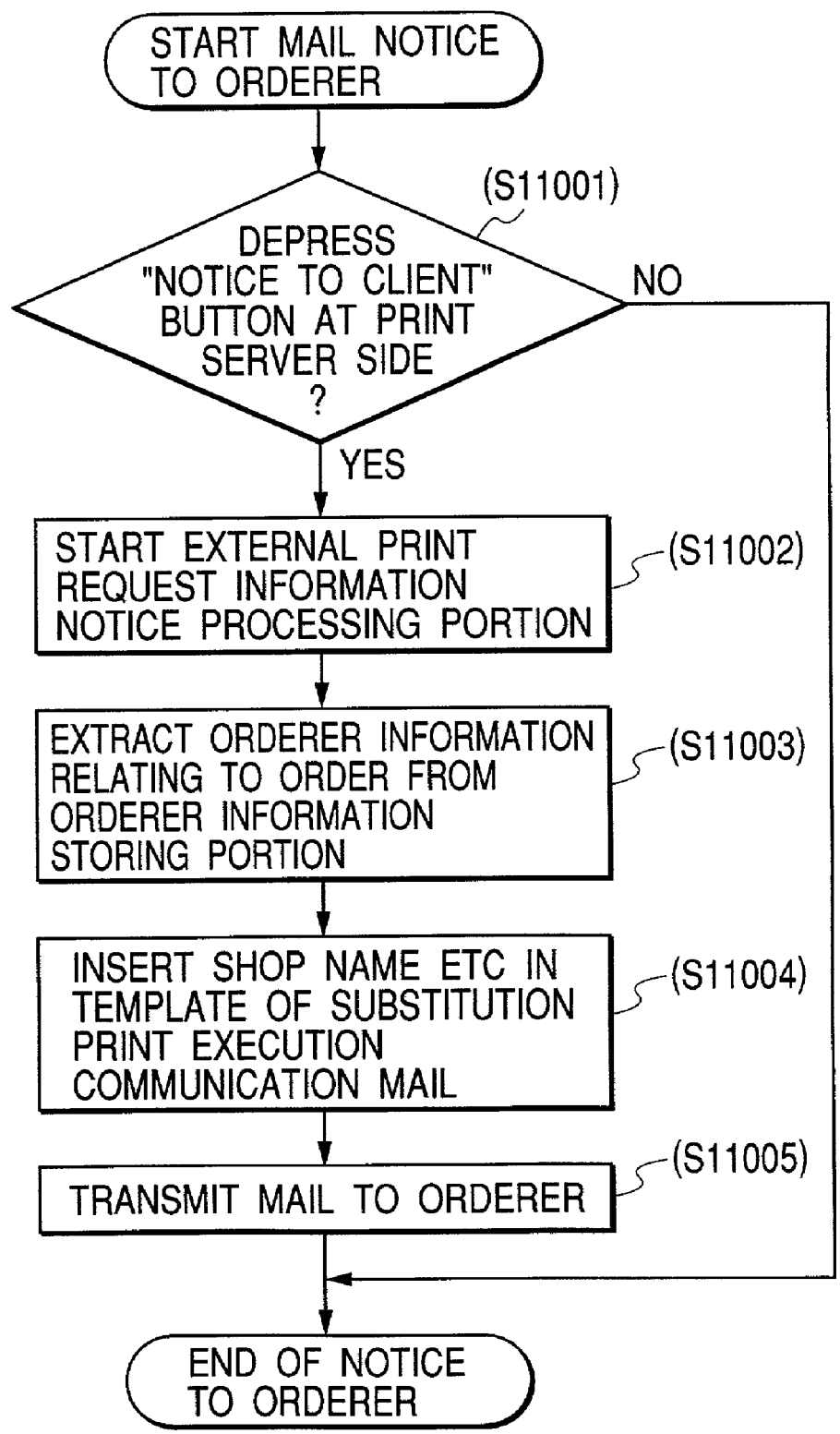
Figure 28:
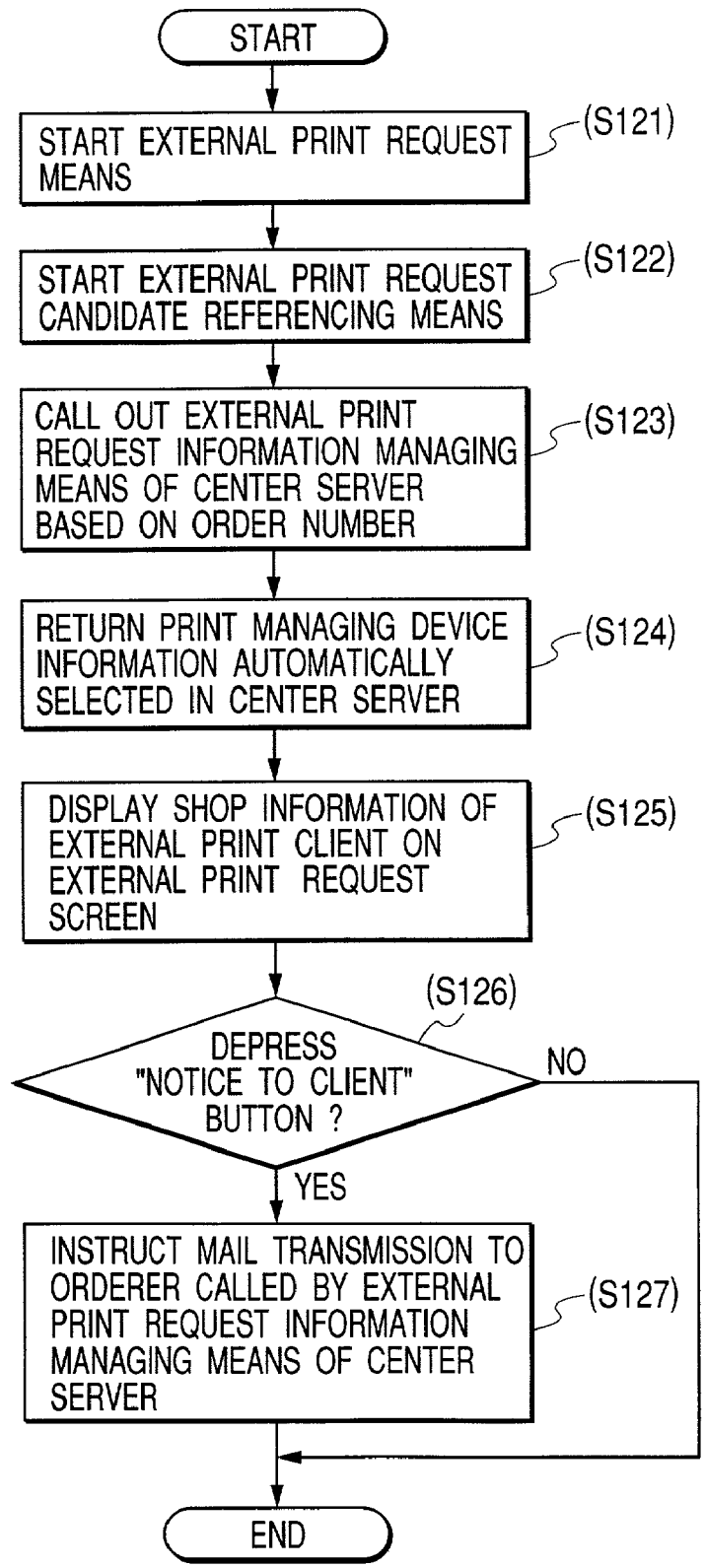
FIG. 28 is a flow chart showing a processing operation at a print server side when a print managing device to which substitution print is requested upon external print request in a print server is acquired by automatic selection executed by a center server.
Figure 29A:
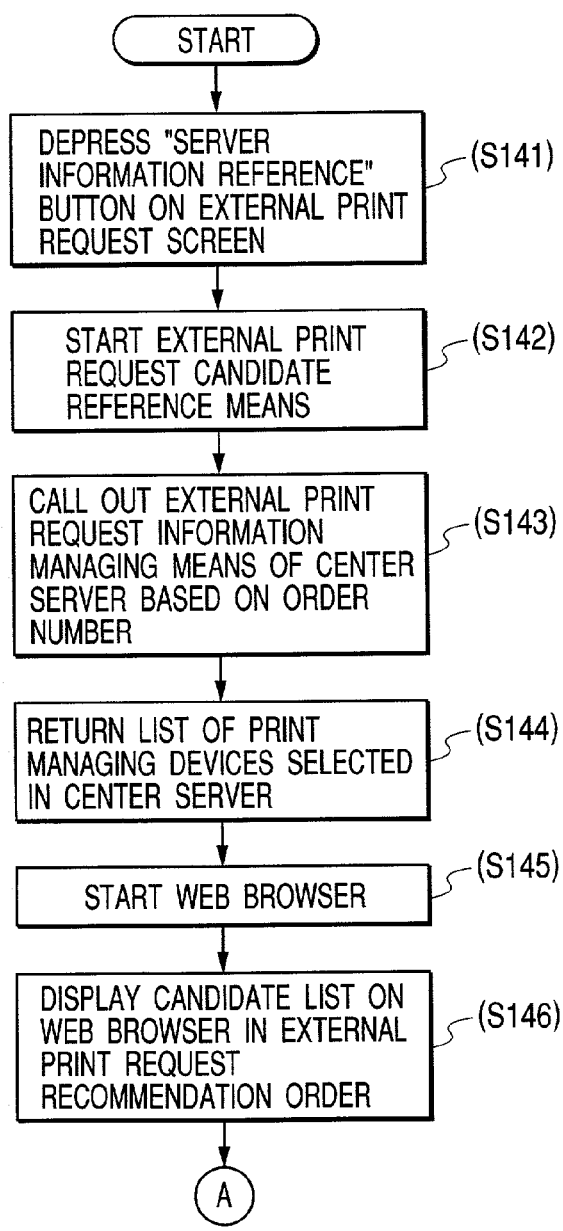
FIGS. 29A and 29B are a flow chart showing a processing operation at a print server side when a list of candidate print managing devices to which substitution print is requested upon external print request in a print server by instructing it to a center server is displayed and is selected by the operator.
Figure 29B:
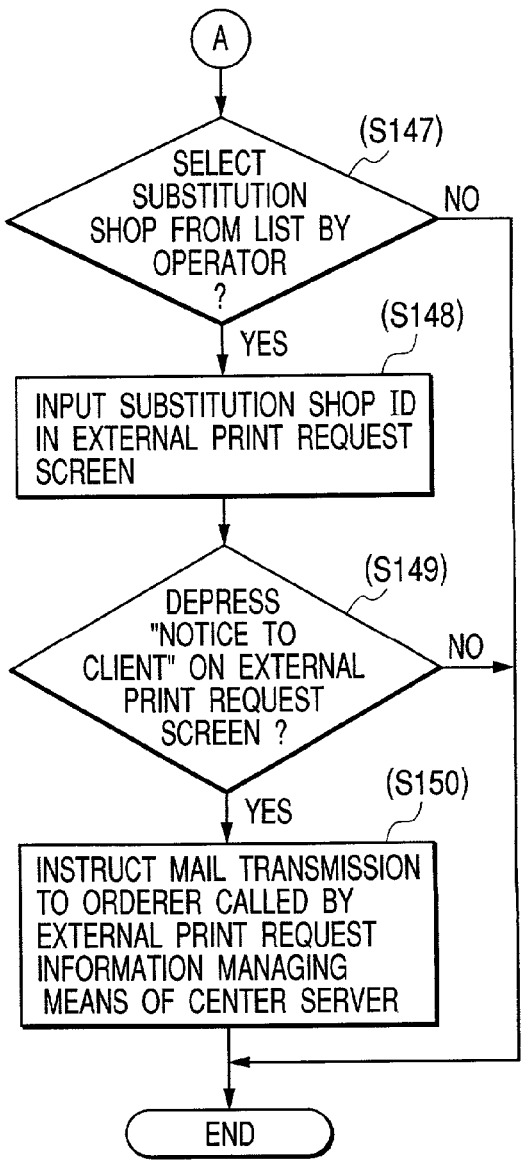

Now, summary of series of processing operations will be explained with reference to FIGS. 15A to 15C, 16A to 16C and 17 and FIGS. 27A to 27C, 28, 29A and 29B. A flow chart of FIGS. 15A to 15C show processing in which the operator taking charge of the print managing device requests the external print processing to other print managing device, a flow chart of FIGS. 16A to 16C show processing in which the operator performs the carry-in print of the print request data requested from other print managing device in his print managing device, and a flow chart of FIG. 17 shows processing when the operator receives notice that the processing of the external print requested to other print managing device is finished. A flow chart of FIGS. 27A to 27C show processing in which the external print request destination is automatically selected by the center server or a list of candidates of the external print request destination is displayed via the center server when the operator taking charge of the print managing device requests the external print processing to other print managing device, a flow chart of FIG. 28 shows center server's processing in which the external print request destination is automatically selected by the center server when the operator taking charge of the print managing device requests the external print processing to other print managing device, a flow chart of FIGS. 29A and 29B show processing in which the list of candidates of the external print request destination is displayed when the operator taking charge of the print managing device requests the external print processing to other print managing device.

FIGS. 15A, 15B and 15C show a flow chart illustrating the processing operation upon the external print request, i.e., processing in which the operator brings out the print data in the print order information storage device 501 to the external print request information storage device 504 via the external print request means 207 and requests the print to other print managing device.

A list of print order data (informations of the order information table 900 and the print related information table 1000) received by the print order acceptance means 204 as the program available by reading it from the program ROM 403 to the RAM 402 by means of the print order information managing means 503 as the program available by reading it from the program ROM 403 to the RAM 402 is displayed on the CRT 406, by the operator (step S1).

The order as the external print request object is selected from the list of the print order data displayed on the CRT 406 in the step S1, by the operator (step S2).

By selecting the external print request processing by the operator in accordance with the screen display displayed on the CRT 406, the external print request processing screen is displayed on the CRT 406 (step S3).

The status retrieval means 206 as the program available by reading it from the program ROM 403 to the RAM 402 retrieves the printing device which coincides with the printer number 1007 in the print related information table 1000 regarding the order of the external print request object by comparing it with the print managing device number 1101 in the printing device vacant status information table 1100 of the printing device vacant status information storing portion 210 in the center server 102, and the candidates of the external-print request destination are displayed in the external print request processing screen on the CRT 406 (step S4).

On the basis of the operator's instruction, the folder to which the external print request information is brought out is selected (step S5), and, when the external print request destination is selected from the candidates of the external print request destination displayed in the step S4 (step S6), a screen through which the operator selects whether he wishes the start of the external print request processing is displayed on the CRT 406 by means of the external print request means 207 as the program available by reading it from the program ROM 403 to the RAM 402 (step S7), and, if the operator does not wish the start of the external print request processing, the external print request processing is ended. If the operator wishes the start of the external print request processing, a folder of the order number as a data storing place is produced in the folder to which the external print request information is brought out and which was selected in the step S5 (step S8).

The data acquirement processing portion 604 reads out the order information of the selected order from the order information storing portion 601 in the HDD 409 onto the RAM 402 (step S9), and the data storage processing portion 605 reserves the order information in the order information storing portion 607 of the folder produced in the step S8 (step S10).

The data acquirement processing portion 604 reads out the print related information of the selected order from the print related information storing portion 602 in the HDD 409 and the print data of the selected order from the print data storing portion 603 in the HDD 409 onto the RAM 402 (step S11), and the data storage processing portion 605 reserves the print related information in the print related information storing portion 608 of the folder produced in the step S9 and the print data in the print data storing portion 609 of the folder produced in the step S9 (step S12).

The data storage processing portion 605 compresses the folder storing the order information storing portion 607, print related information storing portion 608 and print data storing portion 609 as a package file (step S13), and the package file is transmitted to the request destination selected in the step S6 from the printing device vacant status information acquired from the center server 102 in the step S4 by using an electronic mail system (step S14).

The data storage processing portion 605 effects storage in the external print request information table 700 of the external print request information storing portion 610 in the HDD 409 on the basis of the order information read in the step S9, the print related information read in the step S11 and the request destination printing device information selected in the step S6 (step S15).

The external print request screen displayed on the CRT 406 in the step S3 is closed (step S16), and the external print request means 207 is finished. Upon finishing the external print request means 207, the print order information managing means 503 sets the print status 905 of the order information table 900 of the order information storing portion 601 of the order which was subjected to the external print request processing to "external print request" and displays the print status of the list (informations of the order information table 900 and the print related information table 1000) of the print order data displayed on the CRT 406 as "external print request" (step S17) and limits the print processing of the order on the screen in order to prevent double-printing regarding other print managing device to which the print is requested (step S18).

FIGS. 16A, 16B and 16C show a flow chart illustrating the carry-in processing operation of the print data requested from other print managing device, i.e., processing in which the print order data brought out from the print order information storage device 501 to the external print request information storage device 504 via the external print request means 207 by the operator of other print managing device and sent by the electronic mail is carried-in into the print order information storage device 501 by the operator via the carry-in means 208 and the print is effected.

A list of print order data (informations of the order information table 900 and the print related information, table 1000) received by the print order acceptance means 204 by means of the print order information managing means 503 is displayed on the CRT 406 (step S21).

When the carry-in processing is selected by the operator in accordance with the screen displayed on the CRT 406, the carry-in means 208 as the program available by reading it from the program ROM 403 to the RAM 402 displays the carry-in processing screen on the CRT 406 (step S22).

The package file received from other print managing device via the electronic mail is developed and dissolved to obtain the external print request information storage device 504 (step S23).

The data acquirement processing portion 1201 in the carry-in means 208 reads out the list of data on the RAM 402 print-requested from the order information storing portion 607 in the external print request information storage device 504 and displays such list in the print requested data list of the carry-in processing screen displayed on the CRT 406 (step S24).

On the basis of the operator's instruction, the order of the carry-in object is selected on the screen displayed on the CRT 406, and a screen through which the operator selects whether he wishes the start of the carry-in processing in accordance with the screen displayed on the CRT 406 is displayed on the CRT 406 by means of the carry-in means 208 (step S25), and, if the operator does not wish the start of the carry-in processing, the carry-in processing is ended. If the operator wishes the start of the carry-in processing, the data acquirement processing portion 1201 in the carry-in means 208 reads out the order information of the selected order from the order information storing portion 607 in the external print request information storage device 504 onto the RAM 402 (step S26), and the data storage processing portion 1202 reserves the order information such as the print managing device number of the print requester in the order information storing portion 601 in the HDD 409 (step S27).

The data acquirement processing portion 1201 reads out the print related information of the selected order from the print related information storing portion 608 in the external print request information storage device 504 onto the RAM 402 and reads out the print data of the selected order from the print data storing portion 609 in the external print request information storage device 504 onto the RAM 402 (step S28), and the data storage processing portion 1202 reserves the print related information in the print related information storing portion 602 in the HDD 409 and reserves the print data in the print data storing portion 603 in the HDD 409 (step S29).

The carry-in screen displayed on the CRT 406 in the step S22 is closed (step S30), and the carry-in means 208 is finished.

Upon finishing the carry-in means 208, the print order information managing means 503 updates and re-displays the list (informations of the order information table 900 and the print related information table 1000) of the print order data displayed on the CRT 406, with reference to the order information storing portion 601 of the order subjected to the carry-in processing and the print related information storing portion 602, and the order subjected to the carry-in processing is selected by the operator (step S31), and a screen through which the operator selects whether he wishes the print processing in accordance with the screen displayed on the CRT 406 is displayed on the CRT 406 by means of the printing means 502 as the program available by reading it from the program ROM 403 to the RAM 402 (steps S32 and S33), and, if the operator does not wish the start of the print processing, the print processing is ended.

If the operator wishes the start of the print processing, the print data of the print data storing portion 603 is sent to the printing device 303(X) on the basis of the information of the print related information storing portion 602 in the print order information storage device 501, thereby effecting the print processing (steps S34 and S35).

The print screen displayed on the CRT 406 in the step S32 is closed (step S36), and the printing means 502 is finished.

Upon finishing the printing means 502, the print order information managing means 503 updates display of the print processing status on the list screen (informations of the order information table 900 and the print related information table 1000) of the print order data displayed on the CRT 406 to "print finish" and re-displays it (step S37). On the basis of the operator's instruction, the fact that the print is finished is informed to other print managing device of the requester of the print request order to which the print is requested by using the known electronic mail and the print request is brought out (step S38), and deleting processing of the print request order print-requested and brought out (step S39).

The operator sends the printed matter printed in the step S35 to the manager of other print managing device of the external print requester or to the orderer ordering the print by using the client computer 101 via a mail and the like (step S40).

FIG. 17 is a flow chart showing a processing operation for finish confirmation when the fact that the print is finished is received from other print managing device of the external print request destination, i.e., processing in which the data is deleted from the external print request information storing portion 610 of the external print request information storage device 504 by the operator and "print finish" is registered in the center server 102 by the status registration means 205 so that the orderer can recognize.

When the fact that the print processing is finished noticed from other print managing device to which the print is requested by the known electronic mail (step S41), the data deletion processing portion 606 in the external print request means 207 deletes the target order information from the external print request information table 700 of the external print request information storing portion 610 of the external print request information storage device 504 in the HDD 409 (step S42).

The print order information managing means 503 alters the print status 905 of the target order in the order information table 900 of the order information storing portion 601 in the HDD 409 from "external print request" to "print waiting", and the print status displayed as "external print request" of the target order of the list (informations of the order information table 900 and the print related information table 1000) of the print order data displayed on the CRT 406 is updated to "print finish" and re-displays it (step S43), and the print processing limited on the screen in order to prevent the double-printing with respect to other print managing device to which the print is requested is released (step S44).

The print order information 209 in the database 203 in the center server 102 is updated by the status registration means 205 as the program available by reading it from the program ROM 403 to the RAM 402 by means of the print order information managing means 503, and the print processing status of the print order is changed to "print finish" so that the orderer using the client computer 101 recognize the print processing status (step S45).

FIGS. 27A, 27B and 27C show a flow chart illustrating a processing operation of the center server when the print managing device to which the substitution print is requested upon the external print request in the print server is acquired from the center server and show a series of processing operations of the external print request information managing means 10102.

On the basis of instruction from the external print request candidate reference means 206 of the print managing device 301 in the print server 103(X), the external print request information managing means 10102 as the program available by reading it from the program ROM 403 to the RAM 402 is started. When started, the print managing device number indicating the requested print server 103(X), a keyword for discriminating whether the print managing device information of the print managing device to which the recommended substitution print is requested is needed or display of a list of candidate of the print managing devices to which the substitution print is requested is needed, and order number and print data number of the order to be subjected to the external print request processing are transferred to the external print request information managing means 10102 (step S101).

The external print request information retrieval processing portion 10111 of the external print request information managing means 10102 acquires the order number from the order information storing portion 10114 in the print order information storage device 209 on the basis of the transferred order number and acquires the print related information from the print related information storing portion 10115 in the print order information storage device 209 on the basis of the transferred order number and print data number (step S102).

The external print request information retrieval processing portion 10111 retrieves the print managing device information storing portion 10117 of the print server information storage device 210 to provide the print service on the basis of the print service type of the print related information acquired in the step S102 and acquires the list of the print managing devices in which the delivery possible flag is "delivery possible" and the print managing device status is "under operation" and selects the candidates of the print managing devices which are included in the print possible printing device number and in which the printer status shows "available" from the acquired list of the print managing devices (step S103).

The external print request information retrieval processing portion 10111 calculates cost of the substitution print in the list of the candidate of the print managing devices (to which the substitution print is requested) acquired in the step S102 one by one (step S104). A sub-routine showing the cost calculation in detail is illustrated in steps S10401 to S10408, and the sub-routine is repeated by times corresponding to the number of candidates selected in the step S103.

The external print request information retrieval processing portion 10111 extracts one substitution print managing device from the list of candidates selected in the step S103

(step S10401) and retrieves the substitution print priority frequency information storing portion 10124 of the substitution print information storage device 10108 to acquire the belonging print server group number and checks whether the cost regarding the substitution print in the same print server group is dispensed with (disused) or not by checking the substitution print cost disuse flag of the substitution print group information storing portion 10123. If the same print server group (i.e., same as the print managing device number of order information acquired in the step S102) and if the substitution print cost calculation is dispensed with, the program goes to the step S10401, where the next candidate substitution print managing device; whereas, if not the same print server group or if the cost calculation is necessary, the program goes to a step S10403 (step S10402).

In the step S10403, the external print request information retrieval processing portion 10111 starts the estimate processing means 10101 as the program available by reading it from the program ROM 403 to the RAM 402. Upon starting, the print managing device number of the requester print server 103(X), and the order information and print related information regarding the order to be subjected to the external print request are transferred.

The estimate processing means 10101 retrieves the individual print service information storing portion 10119 of the print server information storage device 210 on the basis of the print related information transferred upon starting to acquire the print unit cost, thereby effecting estimate calculation of the print charge (step S10404).

The estimate processing means 10101 checks the receiving method of the print related information transferred upon starting (step S10405). If "delivery" is selected, the program goes to a step S10406; whereas, if "receiving on shop" is selected, the program goes to a step S10407.

In the step S10406, the estimate processing means 10101 calculates the delivery charge from the print managing device of the substitution print candidate to the delivery destination address of the order information transferred in the step S10403, by adding the changed charge of the delivery information storing portion 10120 to the basic delivery charge of the individual print service information storing portion 10119 in the print server information storage device 210.

In the step S10407, the estimate processing means 10101 acquires the address from the print managing device information storing portion 10117 in the print server information storage device 210 on the basis of the print managing device number of the print server 103(X) of the external print request processing requester transferred in the step S10403 and calculates the delivery charge from the print managing device of the substitution print candidate to the print server 103(X) of the external print request processing requester by adding the changed charge of the delivery information storing portion 10120 to the basic delivery charge of the individual print service information storing portion 10119 in the print server information storage device 210. Namely, if the orderer wishes "receiving on-shop" as the receiving method, even when the substitution print has been effected, the delivery to the print server 103(X) of the external print request processing requester is performed so that the orderer can receive the printed matter at the shop which was originally desired by the orderer.

In a step S10408, the estimate processing means 10101 calculates the cost of the substitution print by adding the print charge calculated in the step S10404 to the delivery charge calculated in the step S10406 or S10407. If the processing of all of the print managing device candidates to which the substitution print is requested is not finished, the program goes to the step S10401, where the processing of the next substitution print managing device candidate is continued; whereas, if the processing of all of the print managing device candidates is finished, costs of the list of the substitution print managing device candidates are returned to the external print request information retrieval processing portion 10111 of the external print request information managing means 10102.

In a step S105, the external print request information retrieval processing portion 10111 of the external print request information managing means 10102 receives the costs of the list of the substitution print managing device candidates calculated in the steps S10401 to S10408 in the estimate processing means 10101 and stores them in the memory together with the list of the print managing device informations acquired in the step S103 as a list.

In a step S106, the external print request information retrieval processing portion 10111 determines the keyword for discriminating whether print managing device information of the recommended print managing device to which the substitution print is requested and which was transferred upon starting the external print request information managing means 10102 is needed or the list of the print managing device candidates to which the substitution print is requested is displayed. If the print managing device information of the recommended print managing device to which the substitution print is requested is needed, the program goes to a step S107; whereas, if the display of the list of the print managing device candidates to which the substitution print is requested is needed, the program goes to a step S108.

The external print request information retrieval processing portion 10111 acquires the substitution print condition priority order from the substitution print priority frequency information storing portion 10124 of the substitution print information storage device 10108 and selects the print managing device information having highest priority frequency from the data of the list of the print managing device informations listed in the step S105, regarding the print managing device indicating the requested print server 103 (X). In the illustrated embodiment, it is assumed that the priority order is set in order of "same group", "time limit", "cost" and "area". In this case, first of all, the print managing devices belonging to the same group as the requester print managing device are selected from the list to reserve as candidates, and then, the print managing devices having time limit earlier than that of the requester print managing device are selected to reserve as candidates, and then, the print managing devices having low substitution print processing cost are extracted, and, if the cost is same, the print managing device located nearest to the requester print managing device is selected on the basis of the address information. The candidates are successively restricted in the above-mentioned priority order, thereby ultimately selecting one print managing device as the optimum external print request destination. Then, the print managing device information of the print managing device of the optimum external print request destination is transmitted in response to the request from the external print request candidate reference means 206 of the print managing device 301 of the print server 103(X) in the step S101 (step S107).

The external print request information retrieval processing portion 10111 acquires information having highest priority order (in the illustrated embodiment, "same group") from the substitution print condition priority order by the substitution print priority frequency information storing portion 10124 of the substitution print information storage device 10108 and starts the external print request information proposal processing portion 10112 and transfers the most priority condition upon starting, regarding the regarding the print managing device indicating the requested print server 103(X) (step S108).

The external print request information proposal processing portion 10112 re-arranges the data of the list of the print managing device informations listed in the step S105 on the basis of the most priority condition (in the illustrated embodiment, "same group") transferred upon the starting so that the print managing device information coinciding with the condition is ranked up, and the data of the list of the listed print managing device informations is formed as HTML so that it can be browsed by the Web browser, and such data is returned in response to the request from the external print request candidate reference means 206 of the print managing device 301 of the print server 103(X) in the step S101 (step S109).

A step S110 shows processing when request of mail communication that the substitution print is effected is effected from the external print request candidate reference means 206 of the print managing device 301 to the orderer, which processing will be fully explained with reference to a sub-routine shown in steps S11001 to S11005.

In the step S11001, the "inform to client" button on the dialog of FIG. 13 displayed on the screen of the CRT 406 of the print managing device 301 of the print server 103(X) is depressed, the program goes to a step S11002; whereas, if not depressed, the processing is ended.

The external print request candidate reference means 206 of the print managing device 301 of the print server 103(X) is started, thereby instructing starting of the external print request information managing means 10102 in the central managing device 102. Upon starting the external print request information managing means 10102, when the print managing device number indicating the print server 103(X) which requests the external print, the print managing device number indicating the print server of external print request destination, a keyword for determining the fact that mail communication execution of the substitution print to the orderer is requested, and the order number and print data number of the order of the external print request processing are transferred, the external print request information notice processing portion 10113 is started in accordance with the transferred keyword (step S11002).

The external print request information notice processing portion 10113 of the external print request information managing means 10102 retrieves the orderer information storing portion 10121 in the orderer information storage device 10106 on the basis of the orderer number of the order information transferred upon starting to acquire the orderer name and e-mail address (step S11003).

The external print request information notice processing portion 10113 reads the substitution print processing execution notice mail orderer template and extracts the e-mail address, address, TEL number, name and representative name of the print managing device from the print managing device information storing portion 10117 of the print server information storage device 210 on the basis of the print managing device number indicating the print server 103(X) which requests the external print and the print managing device number indicating the print server of external print request destination transferred upon starting and fits them into the substitution print processing execution notice mail orderer template together with the order information transferred upon starting (step S11004). In an e-mail original formed, there are described the fact that the substitution print is performed by other print server for certain reasons, the fact that the receiving method is not changed, and e-mail address, address, TEL number, name and representative name of the print server performing the substitution print.

The external print request information notice processing portion 10113 sends the e-mail original formed in the step S11004 to the e-mail address of the orderer acquired in the step S11004 (step S11005), and the processing is ended.

FIG. 28 shows the processing operation in the steps S3 and S4 in the flow chart of FIG. 15A in detail and is a flow chart showing the processing operation at the print server 103 side when the print managing device to which the substitution print is requested upon the external print request in the print server 103 is automatically selected by the center server 102 and illustrates the processing of the external print request candidate reference means 206.

When the operator instructs the displaying of the external print request screen from the print order information managing screen displayed on the CRT 406 of the print managing device 301, the external print request means 207 as the program available by reading it from the program ROM 403 to the RAM 402 is started (step S121). The external print request means 207 starts the external print request candidate reference means 206 as the program available by reading it from the program ROM 403 to the RAM 402 and transfers the order number and print data number of the order subjected to the external print request processing (step S122).

The external print request candidate reference means 206 calls out the external print request information managing means 10102 of the central managing device 102 on the basis of the print managing device number of the reference means itself, keyword for discriminating request of the print managing device information of the recommended print managing device to which the substitution print is requested, and the order number and print data number transferred upon starting (step S123).

When the series of processing operations of the center server 102 shown by the steps S101 to S107 in the flow chart of FIG. 27A is completed, the print managing device information of the print managing device of the external print request destination optimal to the external print request candidate reference means 206 is returned, and the external print request candidate reference means 206 transfers the returned information to the external print request means 207 (step S124).

The external print request means 207 fits the information of the print managing device of the external print request destination automatically selected in the center server 102 acquired in the step S124 into the items of request shop ID, shop name, mail address, TEL number, address and representative name on the external print request screen in FIG. 13 and then displays such information on the CRT 406 (step S125).

If the "inform to client" button on the external print request screen displayed in the step S125 is depressed, the program goes to a step S127; whereas, if not depressed (step S126), the processing is ended.

In the step S127, the external print request candidate reference means 206 is started by the external print request means 207, and the order number and print data number of the order for the external print request processing are transferred. The external print request candidate reference means 206 instructs mail transmission representing execution of the substitution print to the orderer by instructing the starting of the external print request information managing means 10102 in the center server 102 on the basis of the print managing device number of the reference means itself, print managing device number indicating the print server of the external print request destination and keyword for discriminating request of mail transmission representing execution of the substitution print to the orderer, and the order number and print data number of the order for the external print request processing.

FIGS. 29A and 29B show the processing operations in the steps S3 and S4 in the flow chart of FIG. 15A in detail and are a flow chart illustrating the processing operation of the print server when the list of candidate print managing devices to which the substitution print is requested is displayed by emitting instruction to the center server upon the external print request in the print server and is selected by the operator, i.e., processing of the external print request candidate reference means 206.

On the basis of the operator's instruction, when the displaying of the external print request screen is instructed on the print order information managing screen displayed on the CRT 406 of the print managing device 301, the external print request means 207 as the program available by reading it from the program ROM 403 to the RAM 402 is started, thereby displaying the external print request screen of FIG. 13. If the operator depresses a "server information reference" button on the external print request screen (step S141), the external print request candidate reference means 206 as the program available by reading it from the program ROM 403 to the RAM 402 is started, and the order number and print data number of the order for the external print request processing are transferred (step S142).

The external print request candidate reference means 206 calls out the external print request information managing means 10102 of the central managing device 102 on the basis of the print managing device number of the reference means itself, keyword for discriminating request of displaying of the list of the candidate print managing devices to which the substitution print is requested, and the order number and print data number transferred upon starting (step S143).

When the series of processing operations of the center server 102 shown by the steps S101 to S109 in the flow chart of FIG. 27A is completed, HTML displaying the list of the candidate print managing devices to which the substitution print is requested is returned (step S144).

The external print request candidate reference means 206 starts the Web browser (step S145), and the print managing device information regarding the substitution print candidates re-arranged in the external print request recommendation order is displayed by displaying the HTML transferred in the step S145 on the Web browser (step S146).

If the operator selects the print managing device which is judged as optimum by himself from the candidate list displayed on the Web browser in the step S146, the program goes to a step S148; whereas, if he does not select (step S147), the series of processing operation are ended.

When the print managing device is selected in the step S147, the print managing device number of the print managing device to which the external print is requested is inputted to the item "request shop ID" on the external print request screen displayed on the CRT 406 (step S148). If the operator depresses the "inform to client" button on the external print request screen displayed in the step S141 (step S149), the program goes to a step S150; whereas, if not depress, the processing is ended.

In the step S150, the external print request candidate reference means 206 is started by the external print request means 207, and the order number and print data number of the order for the external print request processing are transferred. The external print request candidate reference means 206 instructs mail transmission representing execution of the substitution print to the orderer by instructing the starting of the external print request information managing means 10102 in the center server 102 on the basis of the print managing device number of the reference means itself, print managing device number indicating the print server of the external print request destination, keyword for discriminating request of mail transmission representing execution of the substitution print to the orderer, and the order number and print data number of the order for the external print request processing.

As mentioned above, the print managing method for managing the print order data is characterized in that, if the printing device cannot be used when the print order data is printed by the printing device, the print order data in the print order information storage device is stored in the external print request information storage device by the external print request means and is sent to other print managing device having a vacant printing device and the print managing device receiving the print order data carries-in the print order data from the external print request information storage device by the carry-in means to permit the printing device to print the data and to permit the print order information managing portion to manage the external print request status.

Further, in the print managing apparatus in which other print managing device having the vacant condition and registered in the center server by the status registration means is retrieved by the status retrieval means, and the print order data in the print order information storage device managed by the print order information managing portion is brought out to the external print request information storage device by the external print request means and is transmitted, and the print order data of the external print request information storage device received by the retrieved other print managing device can be stored again in the print order information storage device by the carry-in function, the apparatus is characterized in that the external print request means is provided with the data acquirement processing portion for controlling the retrieval of the print order data subjected to the external print request from the print order information storage device, the data storage processing portion for controlling the storage processing of the print data to the external print request information storage device and the data deletion processing portion for controlling the deletion processing of the external print request information stored by the data storage processing portion, and the carry-in means is provided with the data acquirement processing portion for controlling the retrieval of the print data carried-in by the external print request information storage device and the data storage processing portion for controlling the storage processing of the print order data to the print order information storage device, and the print order information storage device is provided with the order information storing portion managed by the print order information managing means and having combined format such as the order number, print managing device number, orderer number, order date and print status, the print related information storing portion managed by the print order information managing means and having combined format such as the order number, print data number, print service type, print part number, order part number, page number and printer number and the print data storing portion for storing the print data to be print-outputted by the printing device, and the external print request information storage device is provided with the order information storing portion stored by the data storage processing portion of the external print request means and having format similar to that of the order information storing portion of the print order information storage device, the print related information storing portion stored by the data storage processing portion of the external print request means and having format similar to that of the print related information storing portion of the print order information storage device, the print data storing portion stored by the data storage processing portion of the external print request means and having format similar to that of the print data storing portion of the print order information storage device, and the bring-out information storing portion in the incorporated main storing device stored by the data storage processing portion of the external print request means and deleted by the data deletion processing portion and having format such as the order number, requester print managing device number and request date.

As mentioned above, according to the print managing method and device, if the printing device which receives the print order via the network cannot be used, by retrieving the print managing device having the vacant condition from the center server and by requesting the printing of the print order data to the vacant print managing device and by executing the carry-in processing with respect to the requested print managing device and by displaying request/non-request status, load dispersion and fail-safe can be achieved systematically. Further, by storing the brought-out external print request information in the removable storing medium such as a magnetic storing medium, an optical storing medium, a photo-magnetic storing medium or a semiconductor storing medium, the print request can be effected to other print managing device which is not connected to the network via on-line.

A part of the print managing device is constituted by a semiconductor memory, for example, RAM (random access memory) or ROM (read-only memory). Further, a control portion for systematically operating the operation input device such as a keyboard or a mouse, the display portion such as CRT (cathode-ray-tube) and the external storage device such as FDD, and the print managing device by interconnecting them is constituted by a known microcomputer or the like.

The incorporated main storing device is provided with the print order information storage device and the external print request information storage device, and the print order information storage device is provided with the order information storing portion for storing the order information, the print related information storing portion for storing the printing device effecting the print and the printing method and the print data storing portion for storing the print data to be outputted to the printing device, and the external print request information storage device is provided with the external print request information storing portion for storing the index information (regarding the requester) of the print order data subjected to the external print request, and the removable medium or the external print request information storage device of the incorporated main storing device is provided with the order information storing portion for storing the order information of the print order data subjected to the external print request, print related information storing portion for storing the printing device effecting the print of the print order data subjected to the external print request and the printing method, and print data storing portion for storing the print data to be outputted to the printing device effecting the print of the print order data subjected to the external print request.

When the operator performs the external print request processing of the print order data because the printing device cannot be used, other print managing device connected to a printing device of same type having a vacant condition is retrieved from the center server by the status retrieval means, and the print order data is acquired from the order information storing portion, print related information storing portion and print data storing portion in the print order information storage device by the data acquirement processing means in the external order information storage device, and the print order data is stored in the removable medium or the order information storing portion, print related information storing portion and print data storing portion in the incorporated main storing device by the data storage processing portion and is compressed, and the print order data is sent by the known electronic mail and the like, and the index information regarding the requester is stored in the external print request information storing portion in the incorporated main storing device, and the fact that the print order data is "external print request" status is displayed by the print order information managing means, thereby limiting the print processing.

When the operator performs carry-in processing of the print order data print of which is requested and which is sent from other print managing device via the known electronic mail and the like, compression of the print order data from the order information storing portion, print related information storing portion and print data storing portion in the external print request information storage device is dissolved and obtained by the data acquirement processing portion in the carry-in means, and the print order data is stored in the order information storing portion, print related information storing portion and print data storing portion in the print order information storage device by the data storage processing portion, and the fact that the print order data is print-requested from other print managing device is displayed by the print order information managing means, and, after the print processing of the print order data is performed, the print finish is informed to the requester print managing device by the known electronic mail and the like, and the print order data is deleted from the print order information storage device, and the printed matter is sent to the external print requester or the orderer.

Further, when the operator receives notice that the print of the print order data external print of which was requested is finished from other print managing device via the known electronic mail and the like, the data deletion processing portion in the external print request means deletes the print order data from the external print request information storing portion in the external print request information storage device, and the status of "external print request" is changed to "print finish" status by the print order information managing means to release the print processing limitation, and the fact that the printing of the order of the print order data is finished is informed to the center server by the status registration means so as to permit the orderer to browse.

(Other Embodiments)

Incidentally, it should be noted that the object of the present invention can be achieved by supplying a storing medium storing a program code of software for executing the functions of the above-mentioned embodiments to a computer of a system or an apparatus connected to various devices to operate the various devices to realize the functions of the above-mentioned embodiments and by operating the various devices in accordance with a program stored in the computer (or CPU or MPU) of the system or the apparatus.

Further, in this case, the program code itself of the software realizes the functions of the illustrated embodiments, and, thus, the program code itself constitutes the present invention. As a medium for transferring the program code, a communication medium (wire circuit such as optical fiber or wireless circuit) in a computer network (LAN, WAN such as internet, radio communication-network and the like) system for propagating and supplying program information as a convey wave can be used.

Further, means for supplying the program code to the computer, for example, a storing medium for storing such program code constitutes the present invention. As the storing medium for storing the program code, for example, a floppy disk, a hard disk, an optical disk, a photo-magnetic disk, CD-ROM, a magnetic tape, a non-volatile memory card or ROM can be used.

Further, it should be noted that, when not only the functions of the above-mentioned embodiments are realized by executing the supplied program code by means of the computer, but also the program code cooperates with OS (operating system) running on the computer or other application software to realize the functions of the embodiments, such program code is included in an embodiment of the present invention.

Further, it should be noted that the present invention includes a concept that, after the program code read out from the storing medium is written in a memory of a function expansion board inserted into the computer or a function expansion unit connected to the computer, a CPU of the function expansion board or of the function expansion unit executes the actual processing partially or totally on the basis of instruction of the program code to realize the functions of the embodiments.

Incidentally, configurations and structures of the parts in the above-mentioned embodiments are merely example for carrying out the present invention, and, thus, it should be noted that the present invention is not limited to such configurations and structures. That is to say, the present invention can be embodied as various aspects without departing from the spirit and main features thereof.

As many apparently widely different embodiments of the present invention can be made without departing from the spirit and scope thereof, it is to be understood that the invention is not limited to the specific embodiments thereof except as defined in the appended claims.

As mentioned above, according to the present invention, in a condition that the printing device cannot be used, print can be requested to other print managing device, and the list of the print data being subjected to the external print request can be browsed, and the double-printing with other print managing device of request destination can be prevented.

What is claimed is:

1. A print system wherein a central managing device for receiving print order data from a client computer is connected to a plurality of print managing devices for managing a printer for effecting print processing of the print order data via a network, comprising:
a first print managing device comprising:
an acquiring unit configured to acquire print order data from said central managing device;
an obtaining unit configured to obtain, from said central managing device, information on a plurality of second print managing devices, when print processing of the print order data cannot be effected by a printer of said first print managing device;
an accepting unit configured to accept a selection of a second print managing device from among the plurality of second print managing devices, which selection is based on the information obtained by said obtaining means;
a storage unit configured to store print data of the print order data;
a transferring unit configured to transfer print request data to the selected second print managing device; and
an updating unit configured to update a print status, after the transfer of the print request data, to a status in which print processing by said first print managing device on the basis of the print order data is not allowed; and
the second print managing devices comprising:
a reading unit configured to read print data of the print order data transferred by said transferring unit from said storage unit; and
a print processing unit configured to effect print processing on the basis of the print data read by said reading unit.

2. A system according to claim 1, wherein said second print managing device further comprises a deleting unit configured to delete the print data in response to the completion of the print processing by said print processing unit.

3. A system according to claim 1, wherein said updating unit updates the print status to a status in which the print processing which is performed by said first print managing device on the basis of the print data is allowed, in response to the completion of the print processing by said print processing unit.

4. A system according to claim 1, wherein said first print managing device further comprises a communication unit configured to notify said central managing device of the print completion, in response to the completion of the print processing by said print processing unit.

5. An apparatus according to claim 1, wherein said second print managing device further comprises a notifying unit configured to notify said first print managing device of print completion, in response to completion of the print processing by said print processing unit.

6. A print managing device which is connected via a network to a central managing device for receiving print order data from a client computer, comprising:
an acquiring unit configured to acquire print order data from said central managing device;
an obtaining unit configured to obtain, from said central managing device, information on a plurality of external print managing devices, when print processing of the print order data cannot be effected by a printer of said print managing device;
a selection accepting unit configured to accept a selection of one external print managing device from among the plurality of external print managing devices, which selection is based on the information obtained by said obtaining means;
a storage unit configured to store print data of the print order data;
a transferring unit configured to transfer print request data to the selected external print managing device;
an updating unit configured to update a print status of said print managing device, after the transfer of the print request data by the transferring unit, to a status in which print processing by the print managing device is not allowed; and a notification accepting unit configured to accept, from said selected external print managing device, a notification of completion of print processing by said selected external print managing device.

7. An apparatus according to claim 6, wherein said updating unit updates the print status to a status in which the print processing is allowed, in response to the acceptance of the notification by said notification accepting unit.

8. An apparatus according to claim 6, further comprising a communication unit configured to notify said central managing device of print completion, in response to the acceptance of the notification by said notification accepting unit.

9. An apparatus according to claim 6, further comprising a receiving unit configured to receive the print data from the central managing device.

10. A control method for a print managing device which is connected via a network to a central managing device for receiving print order data from a client computer, comprising the steps of:
- acquiring print order data from said central managing device;
- obtaining, from said central managing device, information on a plurality of external print managing devices, when print processing of the print order data cannot be effected by a printer of said print managing device;
- accepting a selection of one external print managing device from among the plurality of external print managing devices, which selection is based on the information obtained by said obtaining step;
- storing print data of the print order data;
- transferring print request data to the selected external print managing device;
- updating a print status of the print managing device, after the transfer of the print request data, to a status in which print processing is not allowed by the print managing device; and
- accepting, from said selected external print managing device, a notification of completion of print processing by said selected external print managing device.

11. A computer readable program stored on a computer-readable storage medium, the program for implementing a method for a print managing device which is connected via a network to a central managing device for receiving print order data from a client computer, the program comprising the steps of:
- acquiring print order data from said central managing device;
- obtaining, from said central managing device, information on a plurality of external print managing devices, when print processing of the print order data cannot be effected by a printer of said print managing device;
- accepting a selection of one external print managing device from among the plurality of external print managing devices, which selection is based on the information obtained by said obtaining step;
- storing print data of the print order data;
- transferring print request data to the selected external print managing device;
- updating a print status of the print managing device, after the transfer of the print request data, to a status in which print processing is not allowed by the print managing device; and
- accepting, from said selected external print managing device, a notification of completion of print processing by said selected external print managing device.

* * * * *

UNITED STATES PATENT AND TRADEMARK OFFICE
CERTIFICATE OF CORRECTION

PATENT NO. : 7,170,623 B2
APPLICATION NO. : 10/113679
DATED : January 30, 2007
INVENTOR(S) : Matoba et al.

It is certified that error appears in the above-identified patent and that said Letters Patent is hereby corrected as shown below:

COLUMN 2:
Lines 10-11, "fact that it is optimum which print managing device" should read
-- optimal print managing device, --.

COLUMN 10:
Line 25, "informations." should read -- information. --; and
Line 39, "unit-cost" should read -- unit cost --.

COLUMN 12:
Lines 31-32, "is existed" should read -- exists --; and
Line 64, "is existed" should read -- exists --.

COLUMN 20:
Line 9, "recognize" should read -- recognizes --.

COLUMN 22:
Line 17, "informations" should read -- information --.

COLUMN 23:
Line 3, "regarding the" should be deleted; and
Line 13, "informations" should read -- information --.

Signed and Sealed this

Thirteenth Day of November, 2007

JON W. DUDAS
*Director of the United States Patent and Trademark Office*